United States Patent [19]

Shimbara et al.

[11] Patent Number: 5,394,654
[45] Date of Patent: Mar. 7, 1995

[54] METHOD OF WET-SANDING DEFECTIVE PARTS OF COATING ON VEHICLE BODY AND SYSTEM FOR CARRYING OUT THE METHOD

[75] Inventors: Yoshimi Shimbara; Hiroshi Kiba; Hitoshi Sasaki, all of Hiroshima, Japan

[73] Assignee: Mazda Motor Corporation, Hiroshima, Japan

[21] Appl. No.: 198,397

[22] Filed: Feb. 18, 1994

Related U.S. Application Data

[63] Continuation of Ser. No. 813,649, Dec. 27, 1991, abandoned.

[30] Foreign Application Priority Data

Dec. 28, 1990 [JP] Japan ................................ 2-409301
Dec. 29, 1990 [JP] Japan ................................ 2-416207
Mar. 27, 1991 [JP] Japan ................................ 3-089558

[51] Int. Cl.6 ............................................ B24B 49/12
[52] U.S. Cl. ........................................... 451/6; 451/8; 451/10
[58] Field of Search .................. 51/323, 326, 165.72, 51/165.74, 165.76

[56] References Cited

U.S. PATENT DOCUMENTS

| | | | |
|---|---|---|---|
| 3,992,826 | 11/1976 | Nakaoka et al. | 51/165.72 |
| 4,112,626 | 9/1978 | Watanabe et al. | 51/165.72 |
| 4,541,011 | 9/1985 | Mayer et al. | 356/237 |
| 4,629,319 | 12/1986 | Clarke et al. | 356/237 |
| 4,633,620 | 1/1987 | Lorenzi et al. | 51/165.72 |
| 4,863,268 | 9/1989 | Clarke et al. | 356/237 |
| 4,920,385 | 4/1990 | Clarke et al. | 356/237 |
| 5,023,714 | 6/1991 | Lemelson | 356/237 |
| 5,067,085 | 11/1991 | Wenzel et al. | 51/165.72 |

FOREIGN PATENT DOCUMENTS 58-64157 4/1983 Japan .
224265 12/1984 Japan ................................ 51/162.72

*Primary Examiner*—Jack W. Lavinder
*Attorney, Agent, or Firm*—Sixbey, Friedman, Leedom & Ferguson

[57] ABSTRACT

A coated surface on a vehicle body is visually inspected for defective parts and the defective parts found are marked with defect marks. A TV camera searches the coated surface for the defect marks and transfers data on the positions of the defect marks. A sanding robot wet-sands the marked portions of the coated surface of the vehicle body on the basis of the data given the TV camera.

10 Claims, 21 Drawing Sheets

| VEHICLE TYPE: • • • • | BODY NUMBER | • • • • • | |
|---|---|---|---|
| | NUMBER OF DETE-CTING DIVISION | (x, y) | SANDING GRADE |
| 1 | • • | • • | • |
| 2 | • • | • • | • |

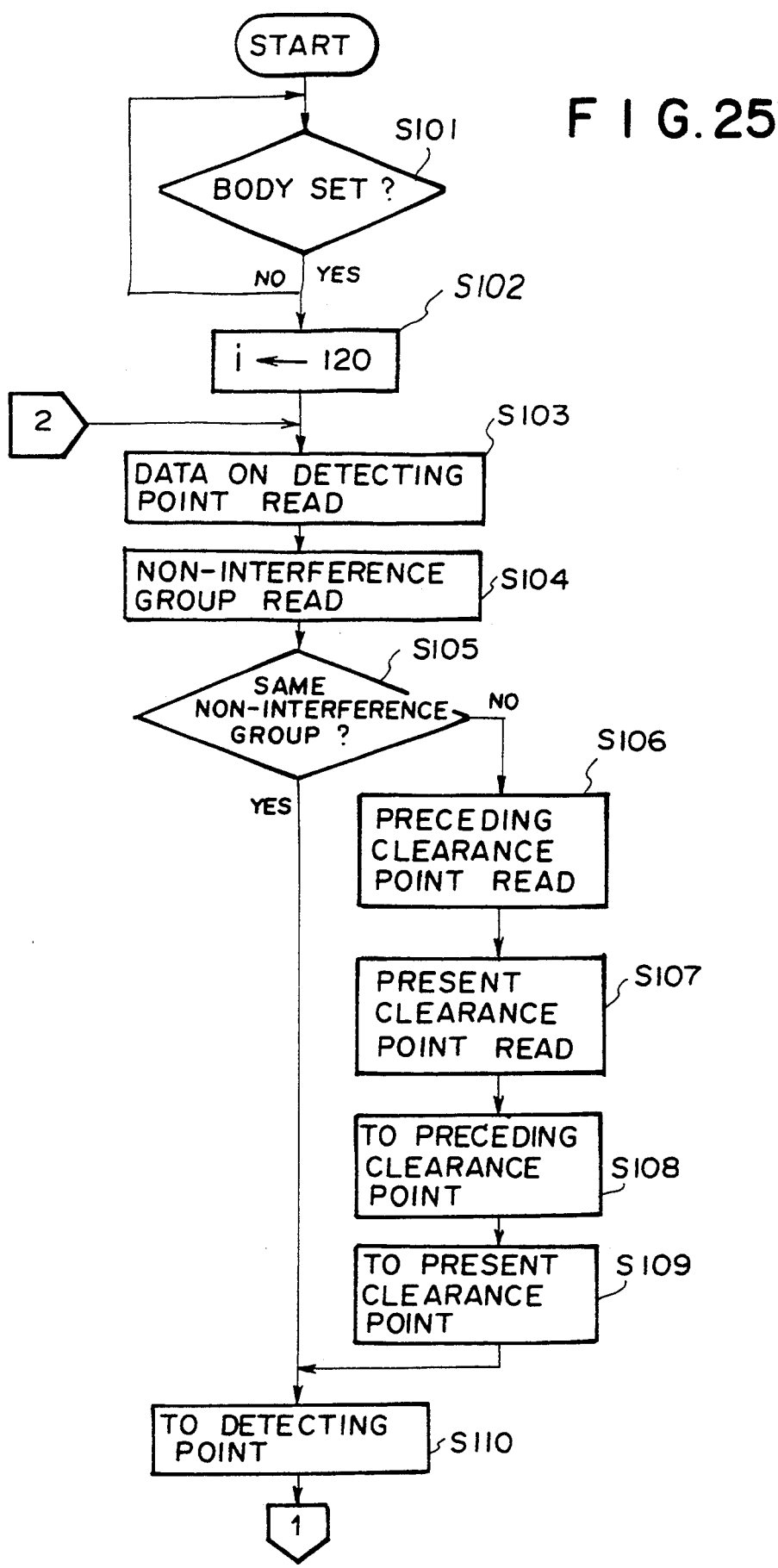

F I G. 28
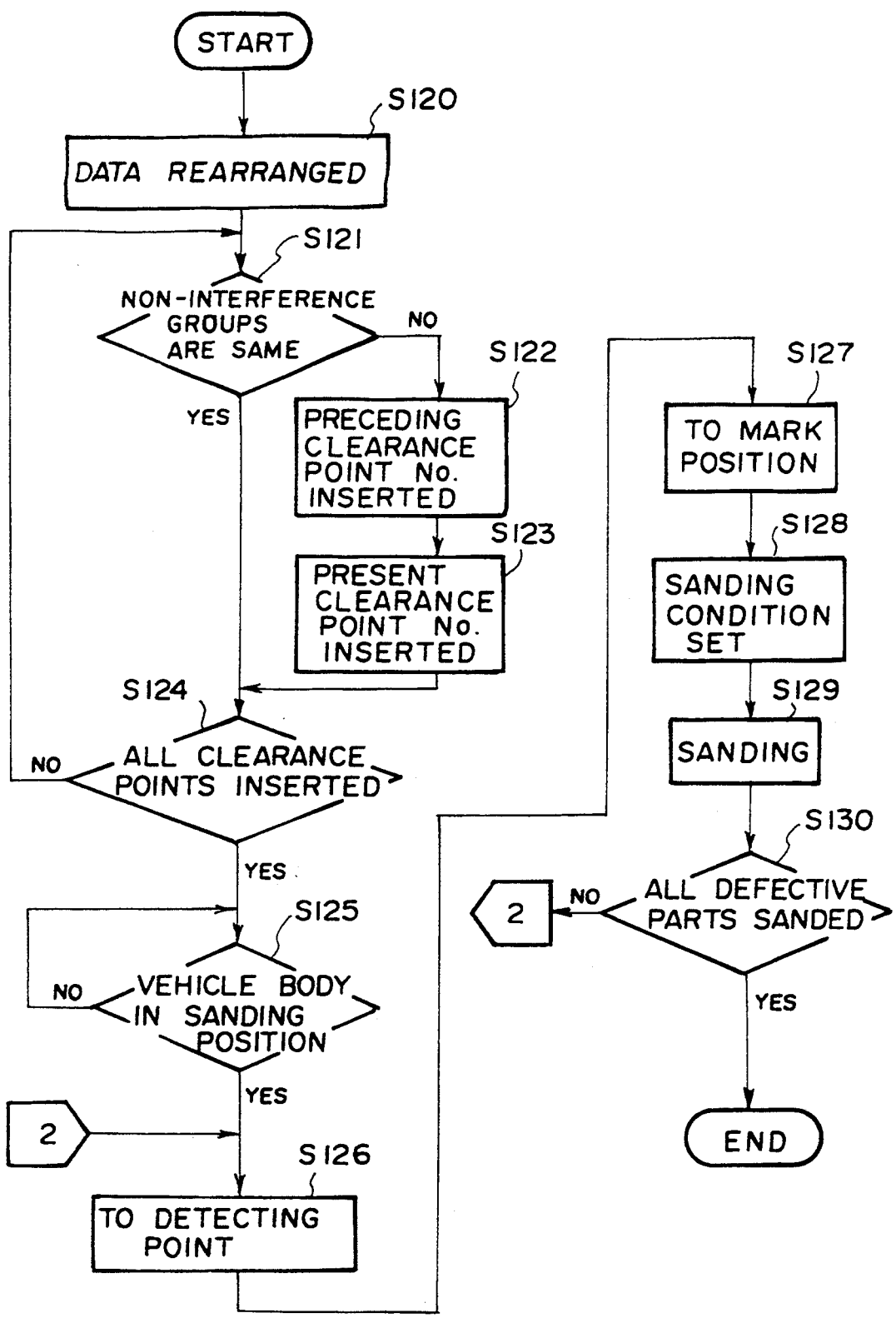

METHOD OF WET-SANDING DEFECTIVE PARTS OF COATING ON VEHICLE BODY AND SYSTEM FOR CARRYING OUT THE METHOD

This application is a continuation Ser. No. 07/813,649, filed Dec. 27, 1991, now abandoned.

BACKGROUND OF THE INVENTION

1. Field of the Invention

This invention relates to a method of wet-sanding defective parts of a coating on a vehicle body and a system for carrying out the method.

2. Description of the Prior Art

As disclosed, for instance, in Japanese Unexamined Patent Publication No. 58(1983)-64517, there have been known a method of automatically wet-sanding a defective coating part of a vehicle body and a system for carrying out the method in which an operator visually inspects a prime coating or intercoating of a vehicle body for defective part and inputs the position of the defective part of the coating found and its state by way of a directing device and a wet sanding system such as a wet sanding robot automatically effects wet sanding on the defective part.

However, the method and the system are disadvantageous in that the operator is apt to input wrong information and it takes a long time for the operator to input the information on the defective part, and accordingly, the time required for correcting the defective part cannot be shortened.

Though this problem may be overcome by automatically detecting a defective part by the use of a TV camera or the like, it is very difficult to surely find a fine defective part such as a pin hole by a TV camera.

SUMMARY OF THE INVENTION

In view of the foregoing observations and description, the primary object of the present invention is to provide a method of and system for wet-sanding a defective part of a coating on a vehicle body which can shorten the time required for correcting the defective part and the fear of providing the wet sanding system with wrong information can be reduced.

In accordance with the present invention, a coated surface of the vehicle body is visually inspected for defective parts and each defective part found is marked with a defect mark. The defect marks are detected by a detecting means such as comprising a TV camera and an image processing means which detects the defect mark on the basis of the image signal from the TV camera. A sanding mechanism such as a sanding robot wet-sands the marked portions on the coated surface on the basis of data on the position of the defect marks given by the detecting means.

Preferably the detecting means and the sanding mechanism comprise robots which are of the same type and have the same coordinate systems whose origins are equally positioned with respect to the vehicle body.

In a preferred embodiment of the present invention, the coated surface of the vehicle body is divided into a plurality of detecting divisions numbered according to a predetermined rule, and the detecting means comprises a TV camera having a detecting range in its field of view which is substantially equal in area to each of the detecting divisions. The TV camera is mounted on a hand of a detecting robot and is moved from detecting division to detecting division. The TV camera is positioned at each detecting division so that its detecting range is centered on the center of the detecting division. Then an image processing means searches the defect mark in the detecting division through the image signal and detects the position of the defect mark found in the detecting division. Data on the position of the defect mark found in each detecting division are transferred to a sanding robot in the form of a combination of the number of the detecting division where the defect mark was found and coordinates which is defined in a coordinate system having its origin on the center of the detecting division in which the defect mark falls and the sanding robot sands the defective parts on the basis of the data.

When the working efficiency of the sanding robots is higher than that of the detecting robots, it is preferred that one sanding robot corrects the defective parts which are found by a plurality of the detecting robots. In such a case, all the data on the defect marks found by the plurality of the detecting robots are transferred to the sanding robot. Preferably, the sanding robot wet-sands the defective parts in a predetermined sanding order and the data on the defect marks found by the plurality of the detecting robots are rearranged to conform to the sanding order.

In a still another embodiment of the present invention, the defect marks are changed in shape or color depending on the grade of sanding required to correct the defective part, and the image processing means detects the grade of sanding required for each defective part and transfers the data on the sanding grade to the sanding robot together with the data on the position of the defect mark. Then the sanding robot controls the sanding tool according to the sanding grade.

BRIEF DESCRIPTION OF THE DRAWINGS

FIG. 25 is a flow chart for illustrating the mark detecting control, FIG. 28 is a flow chart for illustrating the sanding control.

DESCRIPTION OF THE PREFERRED EMBODIMENTS

Figure 1:
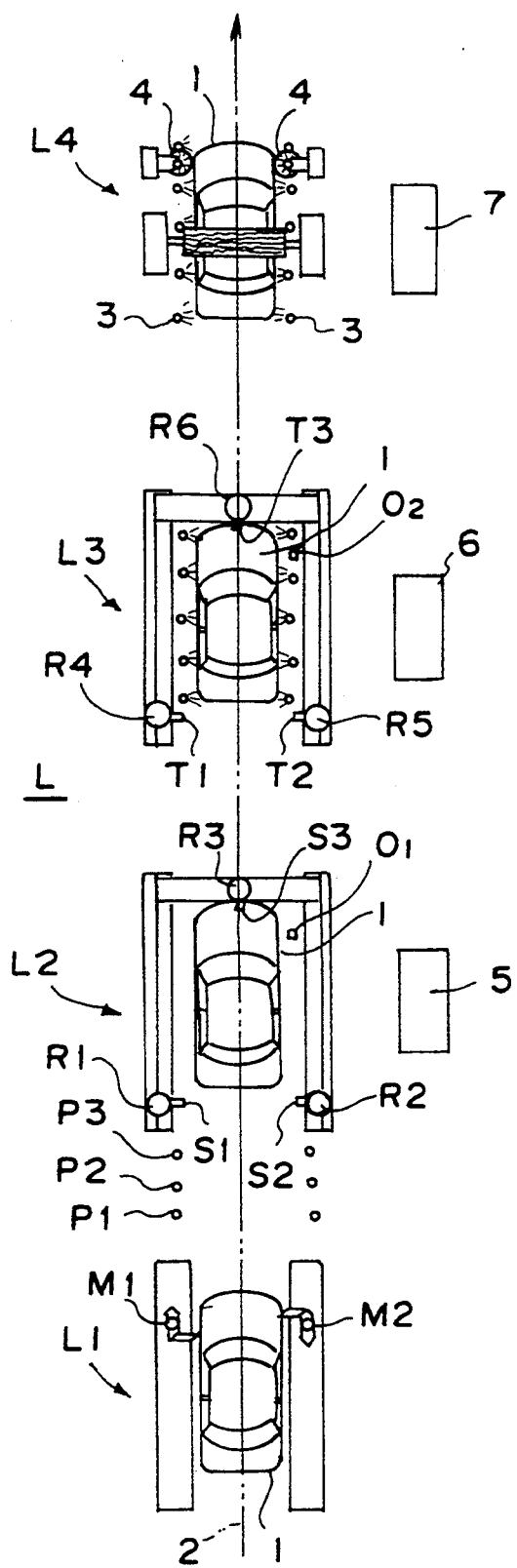
FIG. 1 is a schematic view of an example of a wet sanding line for carrying out the method of the present invention.

In FIG. 1, a wet sanding line L has a conveyor line 2 which conveys a vehicle body 1, which has been provided with a prime coating or intercoating, through a marking station L1, a mark detecting station L2, a sanding station L3 and a water washing station L4. A first reference point O1 is set at the mark detecting station L2 and a second reference point O2 is set at the sanding station L3. The vehicle body 1 is set at the mark detecting station L2 and the sanding station L3 so that the position of the vehicle body 1 relative to the first reference point O1 at the mark detecting station L2 is equal to the position of the vehicle body 1 relative to the second reference point O2 at the sanding station L2.

A plurality of inspectors M1 and M2 are posted at the marking station L1 and visually inspect the coating on the surface of the vehicle body 1. When the inspectors M1 and M2 find a defective part, such as a part having a pin hole or a part having a foreign matter adhering thereto, they mark the defective part with a predetermined defect mark which is determined according to the degree of defect of the defective part. For example, in this particular embodiment, each inspector marks the defective part with a circle when the defective part requires heavy sanding, a triangle when the defective part requires middle sanding and with a square when the defective part requires light sanding. The degree of defect or the grade of sanding required may be classified into more than three or smaller than three. The grade of sanding required may be represented by the color of the defect mark or the size of the defect mark instead of the shape of the defect mark.

Vehicle type sensors P1, P2 and P3 are provided on the upstream side of the mark detecting station L2, and mark detecting robots R1, R2 and R3 are disposed downstream of the vehicle type sensors P1, P2 and P3 to search the left, right and upper surfaces of the vehicle body 1 for the defect marks. The mark detecting robots R1, R2 and R3 are respectively provided with mark detecting cameras S1, S2 and S3 which are non-contact sensors, and detect the position, the shape and the like of the defect marks on the vehicle body 1 and output image signals representing information on the defect marks.

Sanding robots R4, R5 and R6 respectively having sanding tools T1, T2 and T3 are disposed on the left, right and upper sides of the vehicle body 1 at the sanding station L3. The sanding robots R4 to R6 apply the sanding tools T1 to T3 to the position of the marks according to the information given from the mark detecting station L2.

At the water washing station L4, there are provided a plurality of water showers 3 and brushes 4 which are controlled by a water washing control unit 7. At this station, the vehicle body 1 is washed after the wet sanding step.

The control system of the wet sanding line L will be described with reference to FIG. 2, hereinbelow.

Figure 5:
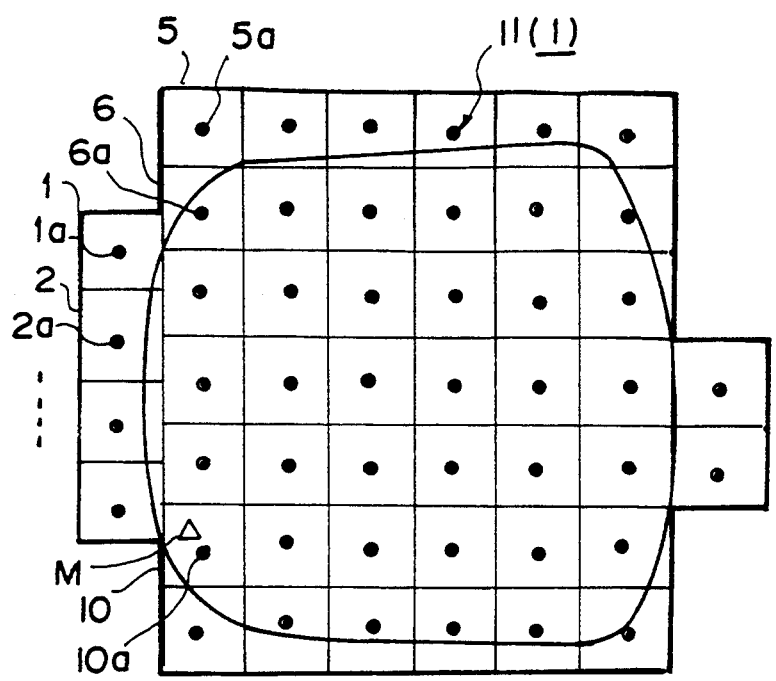
FIG. 5 is a schematic view for illustrating the detecting divisions.
Figure 6:
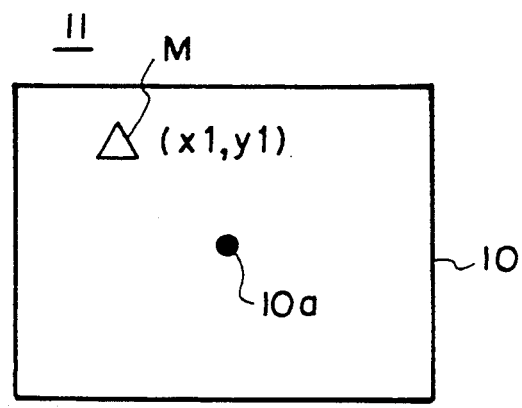
FIG. 6 is a schematic view for illustrating the coordinates of a defect mark in a detecting division.

A detection control unit 5 comprising mark detecting sections 51, 52 and 53, a vehicle type detecting section 54 and detecting robot control sections 55, 56 and 57 is provided for the mark detecting station L2. The mark detecting sections 51 to 53 detect defect marks on the vehicle body 1 through the image signals input from the mark detecting cameras S1 to S3. Each of the left, right and upper surfaces of the vehicle body 1 is divided into a plurality of detecting divisions which are numbered according to a predetermined rule, and each of the mark detecting sections 51 to 53 stores data including the number of the detecting division in which the detected defect mark was found and the coordinates which represent the position of the detected defect mark in the detecting division. The area of each detecting division is determined on the basis of the field of view of the mark detecting cameras S1 to S3. Further the mark detecting sections 51 to 53 determines the grade of sanding required on the basis of the shape of the detected defect mark and stores it as the sanding grade data. After the mark detecting step, the detection control unit 5 sends the data stored in the mark detecting sections to a sanding control unit 6 which will be described later. For example, the engine surface 11 (FIG. 7) is divided into a plurality of detecting divisions 1, 2 . . . as shown in FIG. 5, and when each of the detecting divisions is searched for the defect marks, the mark detecting camera (S1, S2, S3) is positioned so that the center of the field of view thereof coincides with the center (1a, 2a . . .) of the detecting division. (The centers of the detecting divisions will be sometimes referred to as "detecting points", hereinbelow.) The field of view of the mark detecting camera, more strictly, the detecting range in the field of view of the mark detecting camera is substantially the same as each detecting division. The detecting robot control sections 55 to 57 have stored therein positions of the detecting points for the corresponding surfaces of the vehicle body 1 as the coordinates defined on the basis of the first reference point O1 and cause the mark detecting robots 51 to 53 to move the mark detecting cameras S1 to S3 from detecting point to detecting point when searching for the defect marks. The coordinates which represent the position of the defect mark in the-detecting division are defined with the origin of the coordinates on the center of the detecting division or the detecting point of the detecting division as shown in FIG. 6, wherein M represents the defect mark.

The vehicle type detecting section 54 determines the type of the vehicle body 1 on the basis of signals from the vehicle type detecting sensors P1 to P3 and outputs it to the detecting robot control sections 55 to 57 as vehicle type data. The detecting robot control sections 55 to 57 control the mark detecting robots R1 to R3 to conform to the size, shape and the like of the vehicle body 1 on the basis of the vehicle type data from the vehicle type detecting section 54.

A sanding control unit 6 having sanding robot control sections 61, 62 and 63 and sanding tool control sections 64, 65 and 66 is provided for the sanding station L3. The sanding robot control sections 61 to 63 respectively control the sanding robots R4 to R6 according to the data such as the numbers of the detecting divisions from the detection control unit 5. The sanding robot control sections 61 to 63 have stored therein positions of the detecting points for the corresponding surfaces of the vehicle body 1 as the coordinates defined on the basis of the second reference point O2 and cause the sanding robots R4 to R6 to move the sanding tools T1 to T3 first to the detecting points designated by the numbers of the detecting divisions and then to the positions of the defect marks designated by the coordinates defined with the origin on the detecting points of the detecting divisions. Since the surfaces of the vehicle body 1 are not flat, the sanding robot control sections 61 to 63 have stored the orientation of the sanding tool in each detecting division.

The sanding tool control sections 64 to 66 respectively control the sanding tools T1 to T3 according to the sanding grade data from the detection control unit 5. That is, the sanding tools T1 to T3 wet-sand the defective parts on the corresponding surfaces of the vehicle body 1 with sanding forces and/or for times which are determined on the basis of the grade of sanding required.

Figure 2:
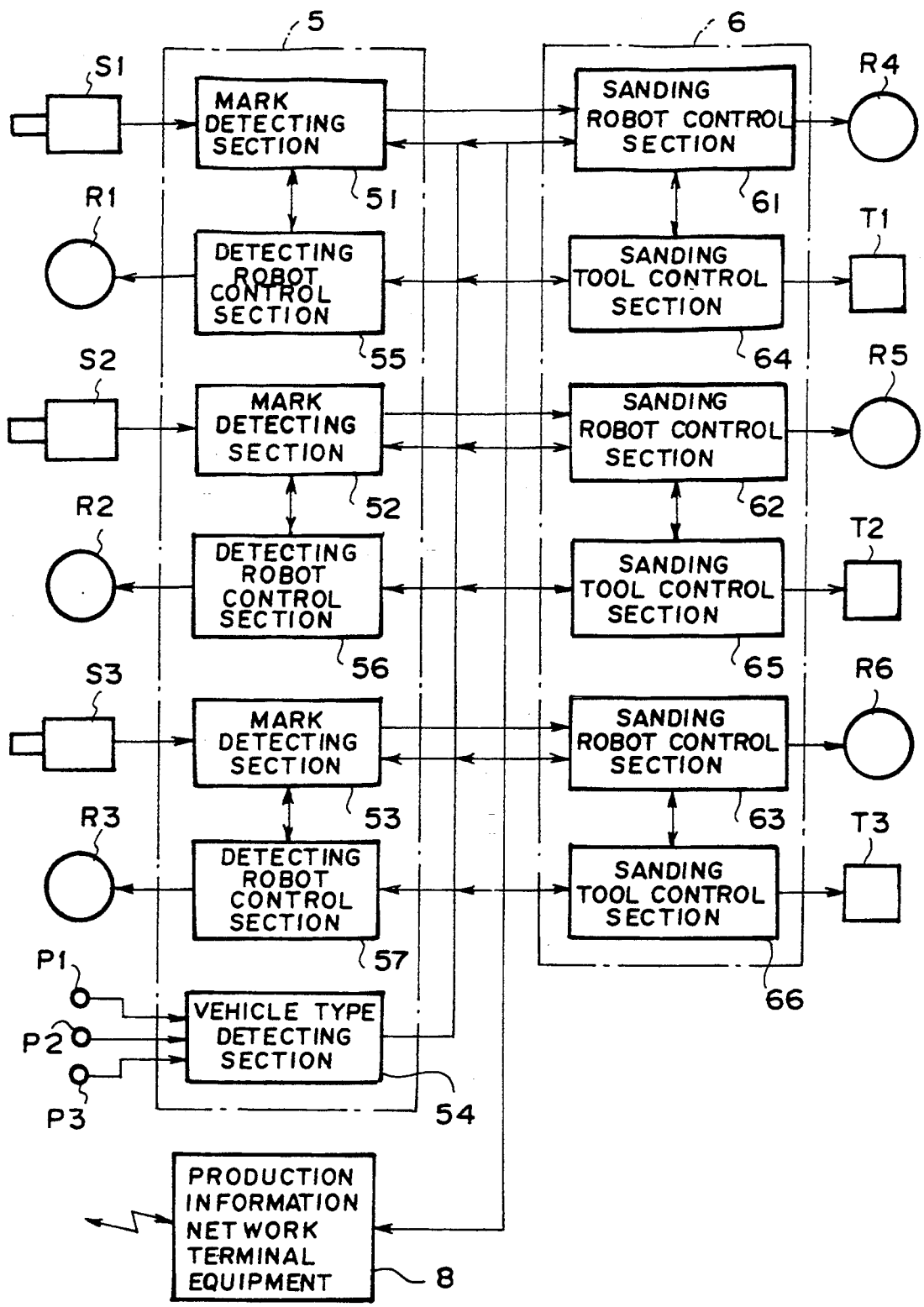
FIG. 2 is a block diagram showing an example of the control system for the wet sanding line.

In FIG. 2, reference numeral 8 denotes a production information network terminal equipment which outputs data from a production control computer (not shown) to the detection control unit 5 and the sanding control unit 6.

Figure 3:
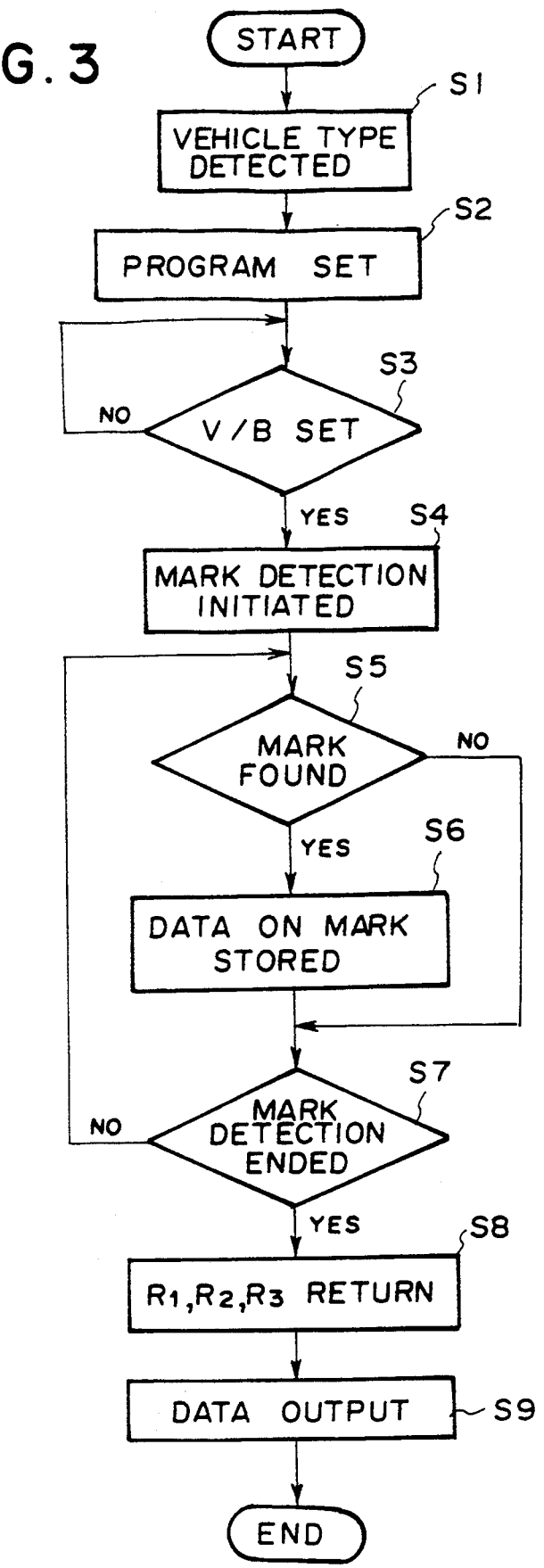
FIG. 3 is a flow chart for illustrating the mark detecting operation.
Figure 4:
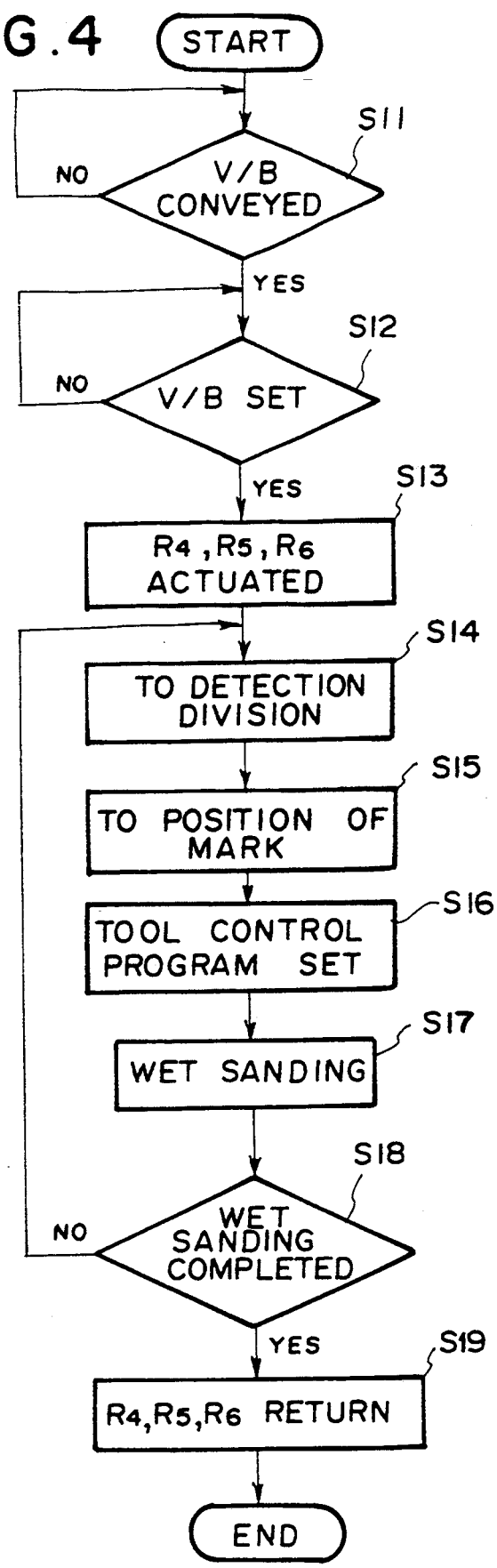
FIG. 4 is a flow chart for illustrating the sanding operation.

The operation at the mark detecting station L2 and the sanding station L3 will be described with reference to the flow charts shown in FIGS. 3 and 4, hereinbelow, In FIG. 3, the detection control unit 5 detects the type of the vehicle body 1, which has been marked with defect marks by the inspectors M1 and M2 at the marking station L1 and is conveyed by the conveyor line 2 to the mark detecting station L2, through the vehicle type detecting sensors P1 to P3 (step S1), and sets the control programs for the mark detecting robots R1 to R3 according to the type of the vehicle body 1 (step S2).

When the vehicle body 1 has been set in a detecting position, the detection control unit 5 causes the mark detecting robots R1 to R3 to begin detecting the defect marks by means of mark detecting cameras S1 to S3. (steps S3 and S4) As described above, each of the left, right and upper surfaces of the vehicle body 1 is divided into a plurality of detecting divisions which are numbered according to a predetermined rule, and the corresponding mark detecting robot moves the mark detecting camera from division to division.

When a defect mark is found, the detection control unit 5 stores the data including the number of the detecting division in which the detected defect mark is found and the coordinates which represent the position of the detected defect mark in the detecting division. (steps S5 and S6) When the mark detecting robots R1 to R3 have searched all the detecting divisions for the defect marks, the mark detecting robots R1 to R3 return to the respective original positions. (steps S7 and S8) Then the detection control unit 5 sends to the sanding control unit 6 the numbers of the detecting divisions in which the detected defect marks were found and the coordinates which represent the positions of the detected defect marks in the detecting divisions in combination with the grades of sanding required to correct the defective parts and the type of the vehicle body 1. (step S9)

When the vehicle body 1 is conveyed to the sanding station L3 and set to a sanding position, the sanding robots R4 to R6 are actuated. (steps S11 to S13 in FIG. 4) Each of the sanding robots R4 to R6 moves the sanding tool first to the center (detecting point) of the detecting division the number of which is the smallest in the detecting divisions where the defect mark were found in the corresponding vehicle body surface, i.e., the left side surface, the right side surface or the upper surface, and then to the position in the detecting division represented by the coordinates. (steps S14 and S15) For example, when the defect mark M was found in the detecting division 10 in the engine hood surface 11 as shown in FIGS. 5 and 6, the sanding robot R6 moves the sanding tool T3 first to the center 10a of the detecting division 10 and to the position represented by the coordinates (x1, y1), i.e., to the defective part indicated by the defect mark.

Then the sanding control unit 6 sets the sanding control program for controlling the sanding force and/or sanding time according to the sanding grade data and then causes the sanding tool to wet-sand the defective part. (steps S16 and S17) When all the defective parts marked with the defect marks have been wet-sanded, the sanding robots R4 to R6 return to the original positions. (steps S18 and S19)

Figure 7:
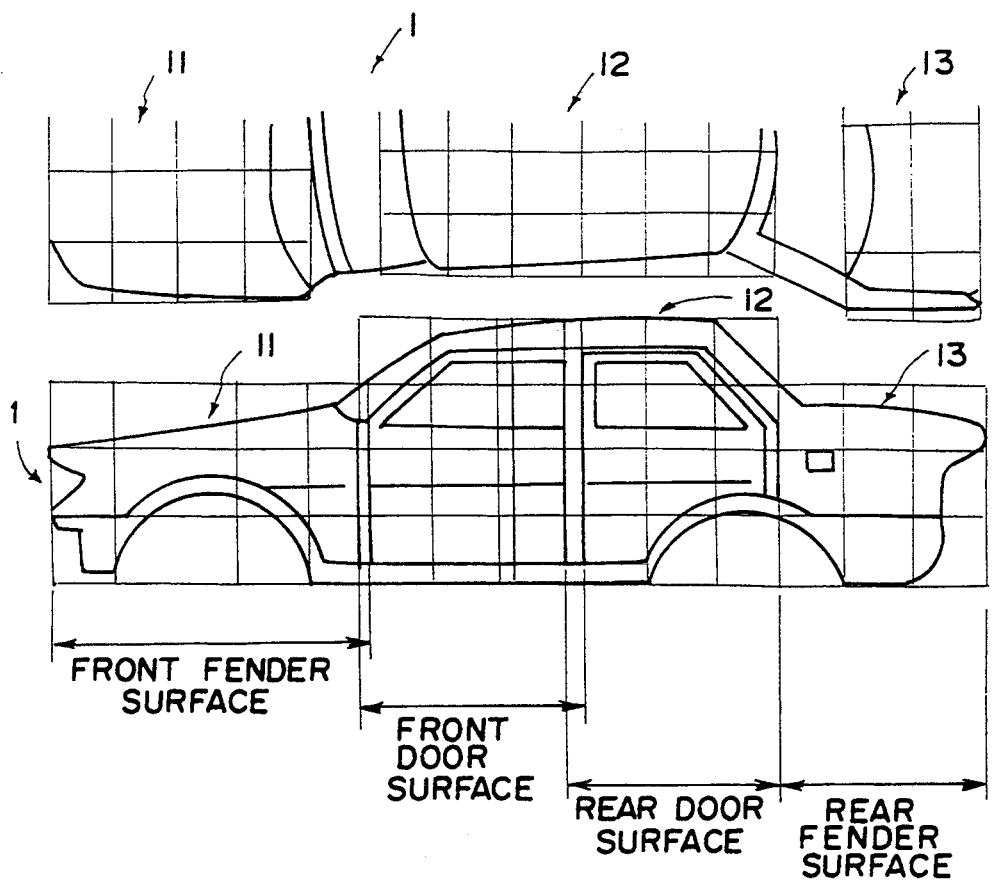
FIG. 7 is a view for illustrating an example of setting of the detecting divisions.

The operation of the sanding robots R4 to R6 will be described in more detail with reference to FIGS. 7 and 8, hereinbelow.

The sanding robots R4 and R5 are disposed on the left and right sides of the vehicle body 1 and respectively wet-sand the left front fender surface, the left front door surface, the left rear door surface and the left rear fender surface, and the right front fender, the right front door surface, the right rear door surface and the right rear fender surface (FIG. 7) in this order. The sanding robot R6 wet-sands the engine hood surface 11, the roof surface 12 and the trunk lid surface 13 in this order. Since the front fender surface, the front door surface, the rear door surface and the rear fender surface are substantially in flush with each other, these surfaces can be handled as one plane. That is, the sanding robots R4 and R5 can linearly move the sanding tools T1 and T2 in parallel to the side surfaces of the vehicle body 1 without fear of interference with the vehicle body 1.

On the other hand, there are relatively large differences in height between the engine hood surface 11 and the roof surface 12 and between the roof surface 12 and the trunk lid surface 13, and accordingly, when the sanding robot R6 directly moves the sanding tool T3 to the detecting division in which the defect mark has been found in the roof surface 12 after the wet sanding in the engine hood surface 11 is completed, the sanding tool T3 can interfere with the vehicle body 1. The detecting division in which the defect mark has bee found will be referred to as "the defective detecting division", hereinbelow. If the sanding robot R6 moves the sanding tool T3 from the engine hood surface 11 to the roof surface 12 along the pillars of the vehicle body 1 in order to avoid interference with the vehicle body 1, it takes a long time.

Figure 8:
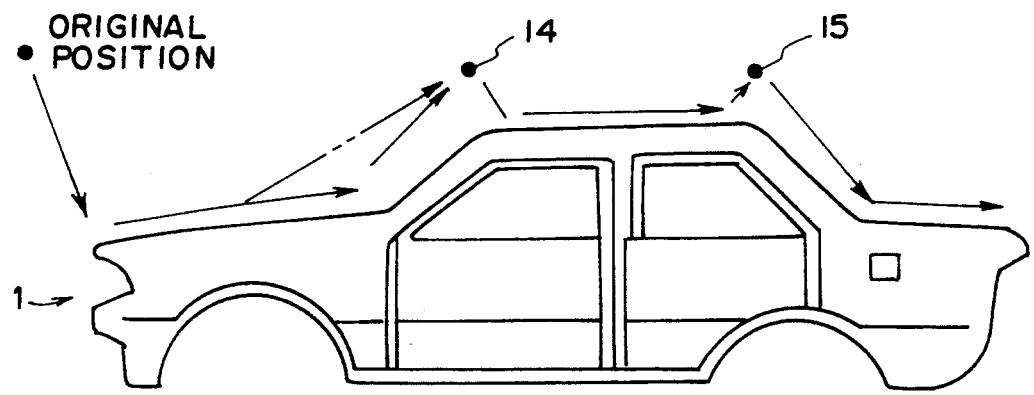
FIG. 8 is a view for illustrating the clearance points.

In this particular embodiment, clearance points 14 and 15 are set as shown in FIG. 8, and the sanding robot R6 is moved to the roof surface 12 from the engine hood surface 11 via the clearance point 14, and to the trunk lid surface 13 from the roof surface 12 via the clearance point 15.

Figure 9:
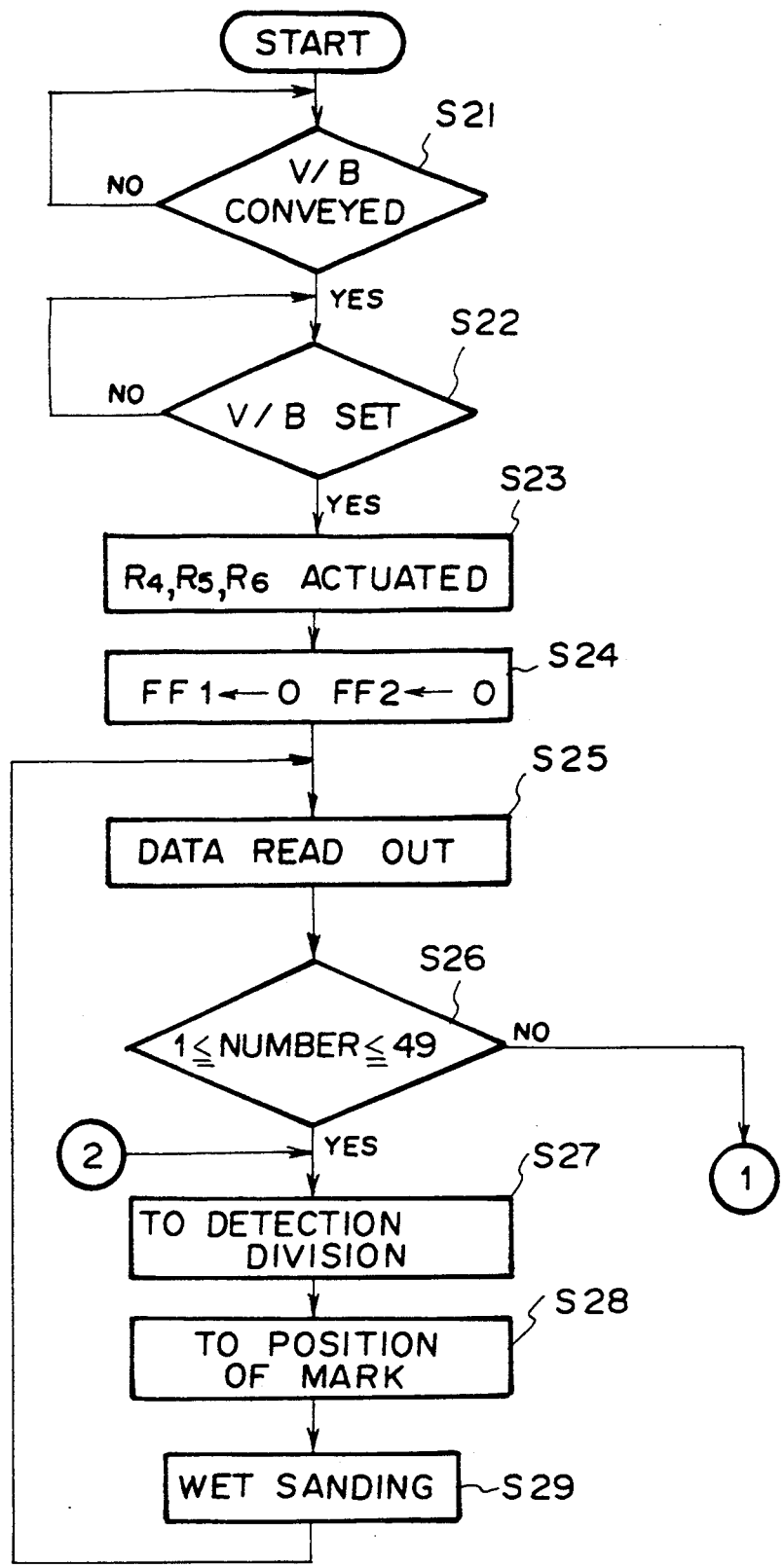
FIGS. 9 and 10 are flow charts for illustrating an example of the operation of the sanding robots.
Figure 10:
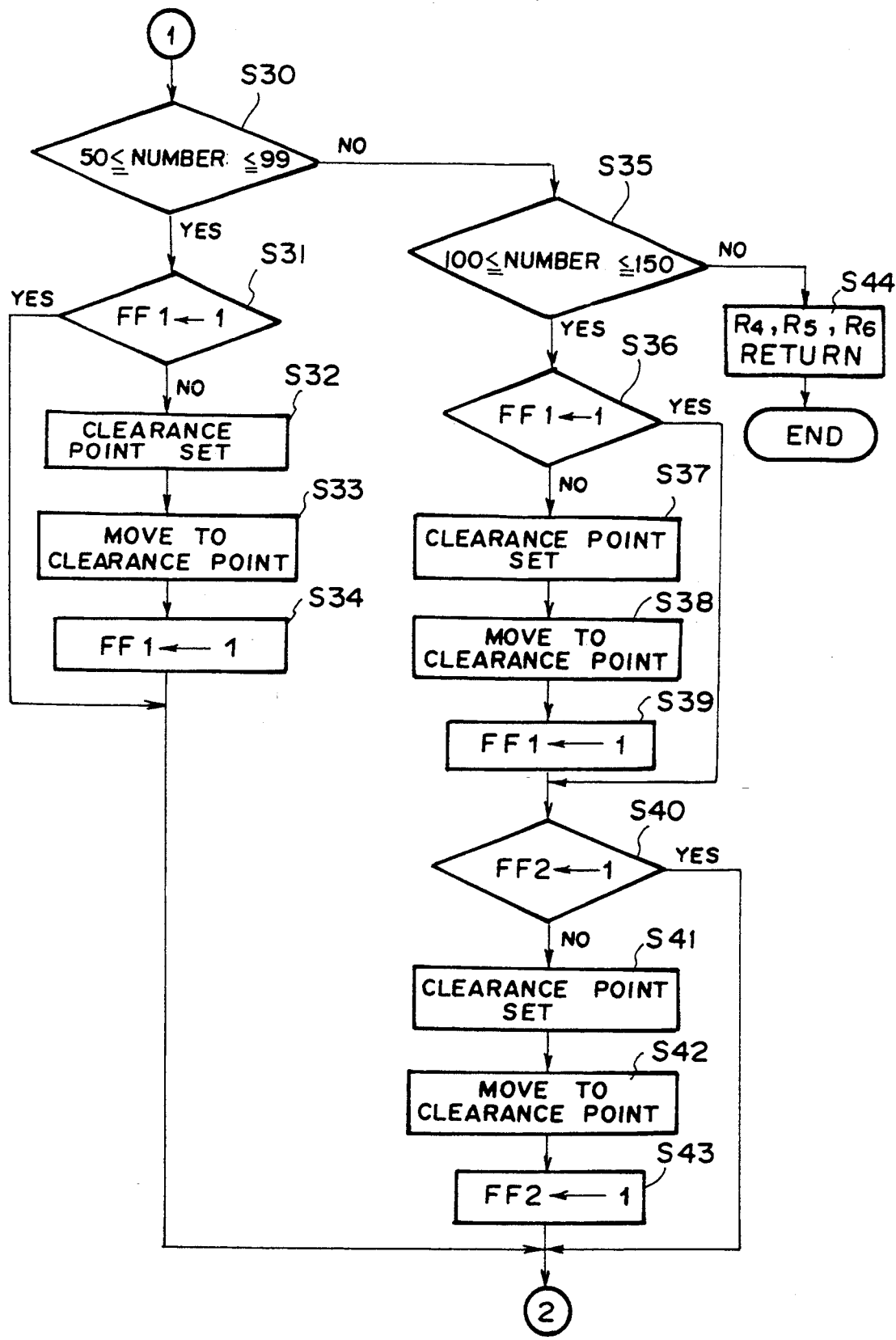

The operation of the sanding robot R6 will be described in more detail with reference to the flow chart shown in FIGS. 9 and 10, hereinbelow. In the description below, it is supposed that the detecting divisions in the engine hood surface 11 are numbered from 1 to 49, those in the roof surface 12 are numbered from 50 to 99 and those in the trunk lid surface 13 are numbered from 100 to 149.

When the vehicle body 1 is conveyed to the sanding station L3 and set to the sanding position, the sanding robot R6 is actuated. (steps S21 to S23 in FIG. 4) Then the clearance flags FF1 and FF2 are reset to 0 in step S24. Thereafter, the number of the defective detecting division which is the smallest in the numbers of the defective detecting divisions is read out together with the coordinates of the defect mark in the detecting division and the grade of sanding of the defective part from the data sent from the detection control unit 50 (step S25)

Then it is determined in step S26 whether the number of the defective detecting division is in the range of No. 1 to No. 49. When it is determined that the number of the defective detecting division is in the range of No. 1 to No. 49, the sanding robot R6 moves the sanding tool T3 first to the center of the detecting division and then to the position in the detecting division represented by the coordinates. (steps S27 and S28) Then the sanding tool T3 is operated to wet-sand the defective part. (step S29) Thereafter the number of the defective detecting division which is the second smallest in the numbers of the defective detecting divisions is read out together with the coordinates of the defect mark in the detecting division and the grade of sanding of the defective part from the data sent from the detection control unit 5, and steps S26 to S31 are repeated for the detecting division. Thus, steps S25 to S29 are repeated until all the defective parts in the engine hood surface 11 (in No. 1 to No. 49 detecting divisions) are corrected.

When all the defective parts in the engine hood surface 11 are corrected, the answer to the question in step S26 turns to NO, and it is determined in step S30 whether the number of the defective detecting division read out at that time is in the range of No. 50 to No. 99. When it is determined that the number of the defective detecting division is in the range of No. 50 to No. 99, it is determined in step S31 whether the clearance flag FF1 has been set to 1, and when it is determined that the clearance flag FF1 has not been set to 1, the clearance point 14 is set in the sanding robot control section 63 and then the sanding robot R6 moves the sanding tool T3 to the clearance point 14. (steps S32 and S33) Thereafter, the clearance flag FF1 is set to 1 in step S34, and steps S27 to S31 are repeated until all the defetive parts in the roof surface 12 (in No. 50 to No. 99 detecting divisions) are corrected.

When all the defective parts in the roof surface 12 are corrected, the answer to the question in step S30 turns to NO, and it is determined in step S35 whether the number of the defective detecting division read out at that time is in the range of No. 100 to No. 150. When it is determined that the number of the defective detecting division is in the range of No. 100 to No, 150, it is determined in step S36 whether the clearance flag FF1 has been set to 1, and when it is determined that the clearance flag FF1 has not been set to 1, the clearance point 14 is set in the sanding robot control section 63 and then the sanding robot R6 moves the sanding tool T3 to the clearance point 14. (steps S37 and S38) Thereafter, the clearance flag FF1 is set to 1 in step S39. Then it is determined in step S40 whether the clearance flag FF2 has been set to 1, and when it is determined that the clearance flag FF2 has not been set to 1, the clearance point 15 is set in the sanding robot control section 63 and then the sanding robot R6 moves the sanding tool T3 to the clearance point 15. (steps S41 and S42) Thereafter, the clearance flag FF2 is set to 1 in step S43 and steps S27 to S30 and S35, S36 and S40 are repeated until all the defetive parts in the trunk lid surface 13 (in No. 100 to No. 150 detecting divisions) are corrected. Why the steps S37 to S39 are performed in addition to steps S32 to S34 is because, if there is no defetive part in the roof surface 12, the clearance point 14 cannot be set and the sanding robot R6 directly moves the sanding tool T3 to the clearance point 15, which can result in interference with the vehicle body 1.

When all the defetive parts in the trunk lid surface 13 are corrected, the answer to the question in step S35 turns to NO, and the sanding robot R6 returns the sanding tool T3 to the original position. (step S44)

As shown by the chained line in FIG. 8, the sanding robot R6 moves the sanding tool T3 to the clearance point 14 as soon as all the defetive parts in the engine hood surface 11 are corrected, and then moves it to the roof surface 12, and as soon as all the defective parts in the roof surface 12 are corrected, the sanding robot R6 moves the sanding tool T3 to the clearance point 15 and to the trunk lid surface 13. In this manner, the sanding robot R6 can move the sanding tool T3 from any detecting division in the engine hood surface 11 to the roof surface 12 or the trunk lid surface 13 or from any detecting division in the roof surface 12 to the trunk lid surface 13 without interference with the vehicle body 1. With this arrangement, the time required to move the sanding tool T3 from one surface to another surface can be shortened as compared with the arrangement where the sanding robot R6 moves the sanding tool T3 from one surface to another surface after the sanding robot R6 moves the sanding tool T3 to scan the whole area of said one surface, i.e., all the detecting divisions in the surface.

The mark detecting operation of the mark detecting cameras Si to S3 at the mark detecting station L2 will be described in more detail, hereinbelow.

In order to prevent overlooking of the defect marks in the boundary between adjacent detecting divisions, the detecting range in the field of view of each of the mark detecting cameras S1 to S3 is set to be slightly larger than each detecting division. That is, when the mark detecting camera (S1, S2, S3) is positioned so that the center of the detecting range thereof coincides with the center of a given detecting division, the detecting range covers an area which includes the given detecting division and parts of the detecting divisions adjacent to the given detecting division, and accordingly, when a defect mark is in the boundary, the defect mark is detected a plurality of times.

Figure 11:
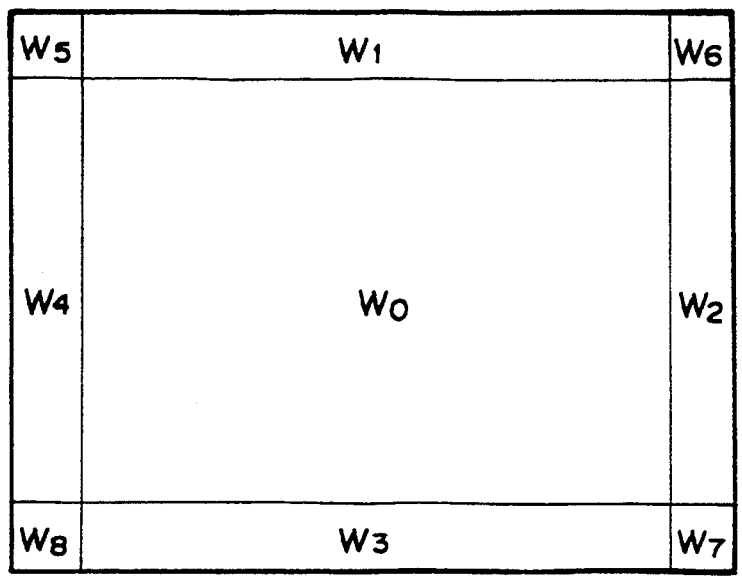
FIG. 11 is a schematic view for illustrating the relation between the detecting range of the detecting camera and the detecting division.

In order to avoid wet-sanding one defective part a plurality of times, the detecting range is divided into nine detecting windows which are numbered with W0 to W8 as shown in FIG. 11. In FIG. 11, the area indicated at W0 conforms to the original detecting division and will sometimes be referred to as "the central detecting window", hereinbelow, whereas the overlapping parts W1 to W8 will be referred to as "the peripheral detecting windows", hereinbelow When a defect mark is found in one of the peripheral detecting windows W1 to W8, it is considered that the defect marks is only in one of the adjacent detecting divisions.

Such a detection of the defect marks will be described in more detail with reference to the flow chart shown in FIG. 12.

Figure 12:
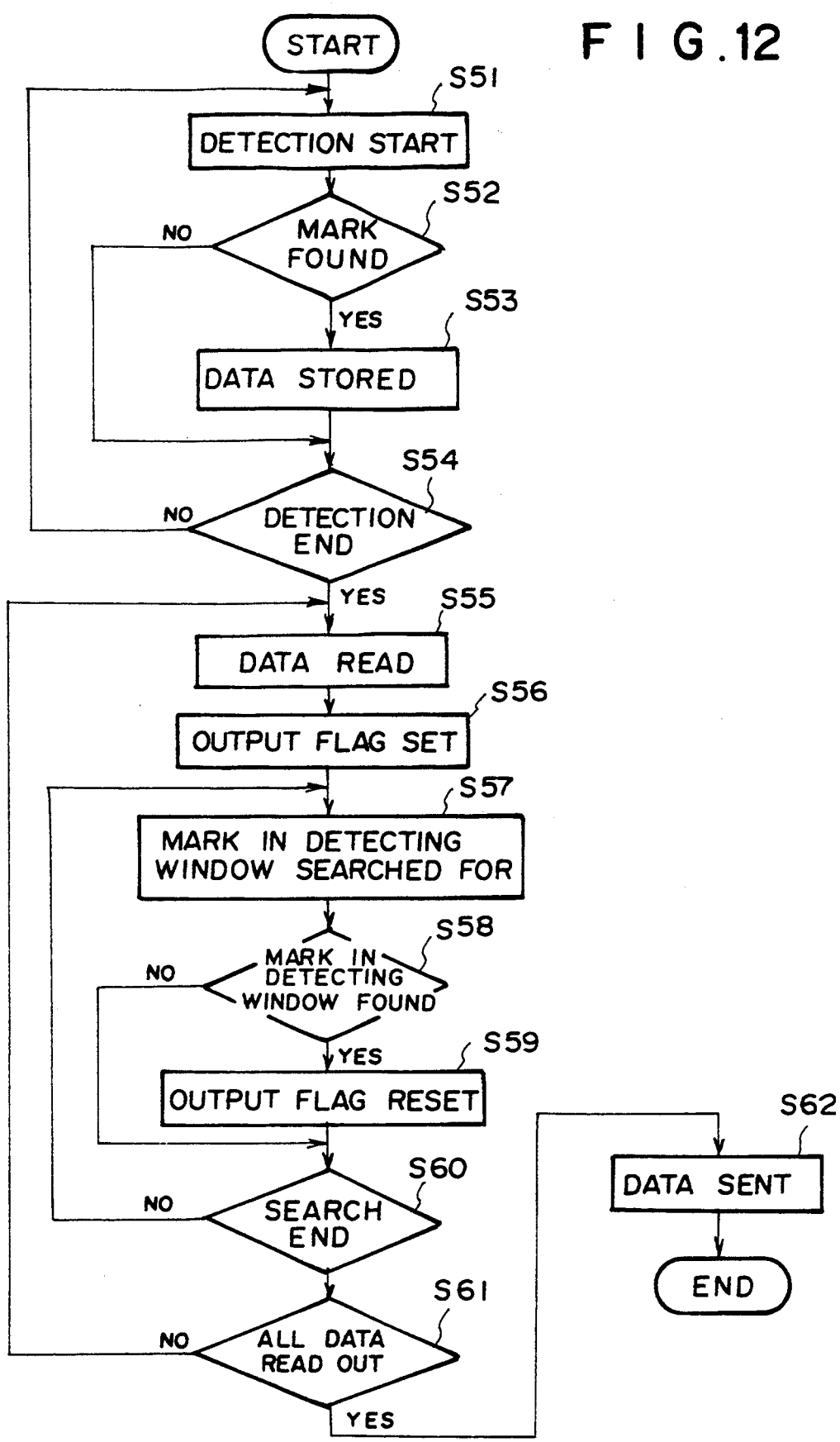
FIG. 12 is a flow chart for illustrating the mark detecting operation in more detail.

In FIG. 12, when the vehicle body 1 conveyed from the marking station L1 has been set in the mark detecting position, the mark detecting cameras S1 to S3 begin to detect the defect marks. (step S51) When a defect mark is detected in a detecting division, the number of the defective detecting division, the coordinates of the defect mark representing the position of the defect mark in the defective detecting division, and the grade of sanding required are stored. (steps S52 and S53) If the defect mark is in one of the peripheral detecting windows W1 to W8 (will be referred to as "the defective peripheral detecting window", hereinbelow), the number of the peripheral detecting window is also stored in step S53. Thus the number of the detecting division, the coordinates of the defect mark in the respective defective detecting divisions, the grade of the sanding required for the defective part and the number of the defective peripheral detecting window are stored for all the defect marks. (step S54) Then the data for all the defect marks are read out and an output flag is set to 1 for each defect mark. (steps S55 and S56) Then the defect marks in the defective peripheral detecting windows are taken out in the order of the number of the detecting division in which the defect marks lie, and the adjacent detecting divisions having peripheral detecting windows which overlap the defective peripheral detecting window are extracted, and the output flag corresponding to the defect marks in the peripheral detecting windows of the adjacent detecting divisions are reset to 0. (steps S57 to S59) After steps S57 to S59 are executed for all the defect marks in the defective peripheral detecting windows, the data for the defect marks the output flag for which have been set to 1 only are sent to the sanding control unit 6o (steps S60 to S62)

The operation in steps S57 to S59 will be described in more detail with reference to FIG. 13 and the following table 1 and table 2.

Figure 13:
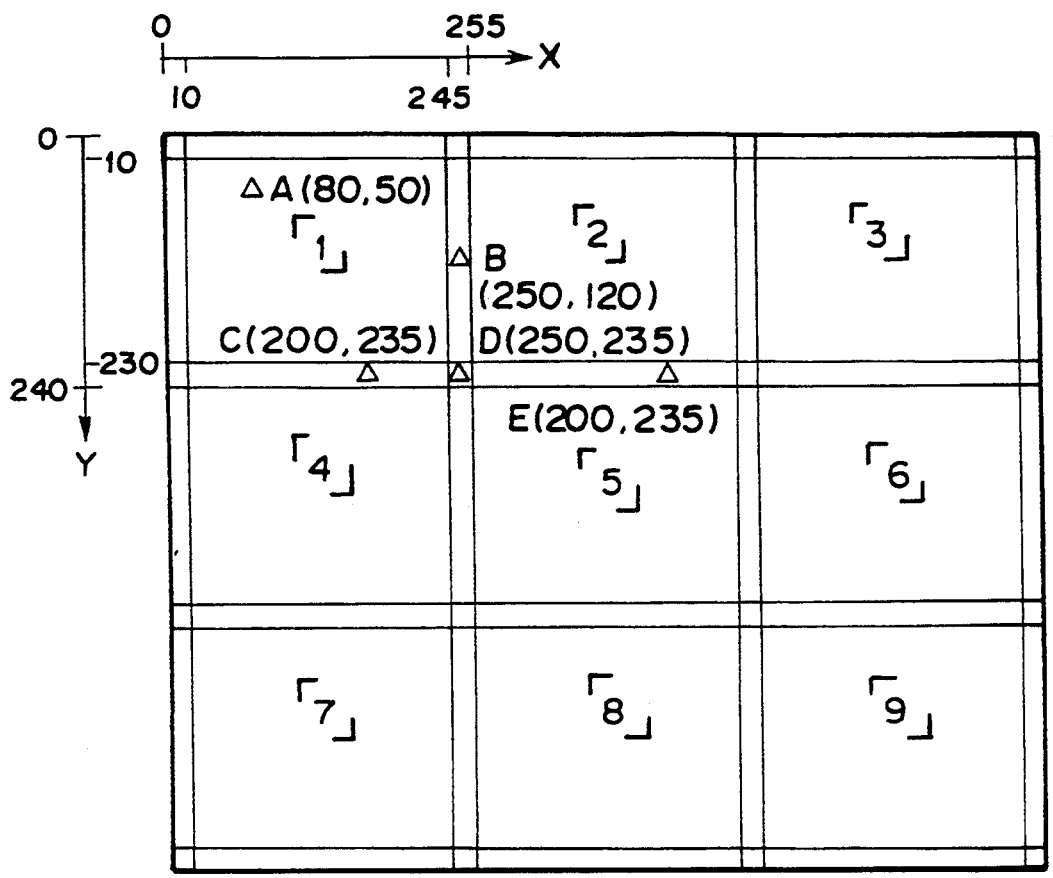
FIG. 13 is a schematic view for illustrating the mark detecting operation in more detail associated with the flow chart shown in FIG. 12, FIGS. 14 and 15 are flow charts for illustrating a modification of the mark detecting operation.

For the purpose of simplicity, it is supposed that there are only No. 1 to No. 9 detecting divisions arranged as shown in FIG. 13, and defect marks A to E exist as shown in FIG. 13. The coordinates of the defect marks A to D shown in FIG. 13 are the values in the No. 1 detecting division, and those of the defect mark E are values in the No. 2 detecting division.

In table 1, "O/L W." represents the number of the peripheral detecting window which overlaps with a given peripheral detecting window (designated on the top of the column) of a given detecting division which is designated in the leftmost column of the table. For example, the peripheral detecting window W2 of the No. 1 detecting division is adjacent to the No. 2 detecting division and overlaps with the peripheral detecting window W4 of the No. 2 detecting division. In the tables 1 and 2, 0 indicates that there is no adjacent detecting division.

TABLE 1

| DETECTING DIVISION No. | ADJACENT WINDOW | | | | | | | | | | | | | | | |
|---|---|---|---|---|---|---|---|---|---|---|---|---|---|---|---|---|
| | $W_1$ | $W_2$ | $W_3$ | $W_4$ | $W_5$ | | | | $W_6$ | | | $W_7$ | | $W_8$ | |
| 1 | 0 | 2 | 4 | 0 | 0 | 0 | 0 | 2 | 0 | 0 | 5 | 4 | 2 | 4 | 0 | 0 |
| 2 | 0 | 3 | 5 | 1 | 1 | 0 | 0 | 3 | 0 | 0 | 6 | 5 | 3 | 5 | 4 | 1 |
| 3 | 0 | 0 | 6 | 2 | 2 | 0 | 0 | 0 | 0 | 0 | 0 | 6 | 0 | 6 | 5 | 2 |
| 4 | 1 | 5 | 7 | 0 | 0 | 0 | 1 | 5 | 1 | 2 | 8 | 7 | 5 | 7 | 0 | 0 |
| 5 | 2 | 6 | 8 | 4 | 4 | 1 | 2 | 6 | 2 | 3 | 9 | 8 | 6 | 8 | 7 | 4 |
| 6 | 3 | 0 | 9 | 5 | 5 | 2 | 3 | 0 | 3 | 0 | 0 | 9 | 0 | 9 | 8 | 5 |
| 7 | 4 | 8 | 0 | 0 | 0 | 0 | 4 | 8 | 4 | 5 | 0 | 0 | 8 | 0 | 0 | 0 |
| 8 | 5 | 9 | 0 | 7 | 7 | 4 | 5 | 9 | 5 | 6 | 0 | 0 | 9 | 0 | 0 | 7 |
| 9 | 6 | 0 | 0 | 0 | 8 | 5 | 6 | 0 | 6 | 0 | 0 | 0 | 0 | 0 | 0 | 8 |
| O/L WINDOW | 3 | 4 | 1 | 2 | 6 | 7 | 8 | 5 | 7 | 8 | 5 | 6 | 8 | 5 | 6 | 7 |

O/L WINDOW = OVERLAPPING WINDOW

TABLE 2

| MARK | DETECTING DIVISION NO. | COORDINATES X | Y | SANDING GRADE | WINDOW NUMBER | OUTPUT FLAG | |
|---|---|---|---|---|---|---|---|
| A | 1 | 80 | 50 | 1 | 0 | 1 | ←A1 |
| B | 1 | 250 | 120 | 2 | 2 | 1 | ←B1 |
| C | 1 | 200 | 235 | 3 | 3 | 1 | ←C1 |
| D | 1 | 250 | 235 | 1 | 7 | 1 | ←D1 |
| B | 2 | 5 | 120 | 2 | 4 | 0 | ←B2 |
| D | 2 | 5 | 235 | 1 | 8 | 0 | ←D2 |
| E | 2 | 200 | 235 | 3 | 3 | 1 | ←E2 |
| C | 4 | 200 | 5 | 3 | 1 | 0 | ←C4 |
| D | 4 | 250 | 5 | 1 | 6 | 0 | ←D4 |
| D | 5 | 5 | 5 | 1 | 5 | 0 | ←D5 |
| E | 5 | 5 | 235 | 3 | 1 | 0 | ←E5 |

The defect mark A is detected only when the No. 1 detecting division is searched since it is in the central detecting window W0 of the No. 1 detecting division as shown in FIG. 13. The defect mark B is in the peripheral detecting window W2 of the No. 1 detecting division and accordingly it is detected both when the No. 1 detecting division is searched and when the No. 2 detecting division is searched. The defect mark C is in the peripheral detecting window W3 of the NO. 1 detecting division and accordingly it is detected both when the No. 1 detecting division is searched and when the No. 4 detecting division is searched. The defect mark D is in the peripheral detecting window W7 of the No. 1 detecting division and accordingly it is detected when the No. 1 detecting division is searched, when the No. 2 detecting division is searched, when the No. 4 detecting division is searched and when the No. 5 detecting division is searched. (steps S51 to S54)

All the data on the defect marks A to E are read out in combination with the numbers of the detecting divisions in which they are found and the like as shown in table 2, and the output flags for all the data are set to 1. (steps S55 and S56)

Since the defect mark A is detected only when the No. 1 detecting division is searched, there is only one set of data on the defect mark A (A1 in table 2). Accordingly, the output flag for the data A is left set to 1.

There are two sets of data on the defect mark B, data B1 obtained when the No. 1 detecting division is searched and data B2 obtained when the No. 2 detecting division is searched. In this case, the No. 2 detecting division which is adjacent to the peripheral detecting window W2 of the No. 1 detecting division and the peripheral detecting window W4 of the No. 2 detecting division which overlaps with the peripheral detecting window W2 of the No. 1 detecting division are extracted from table 1 and the output flag for the data B2 is reset to 0. (step S59) In the similar manner, the output flag for the data C4 on the defect mark C obtained when the No. 4 detecting division is searched is reset to 0, the output flag for the data E5 on the defect mark E obtained when the No. 5 detecting division is searched is reset to 0, and the output flags for data D2, D4 and D5 on the defect mark D which are respectively obtained when the No. 2, No. 4 and No. 5 detecting divisions are searched, are reset to 0. (step S59) Then the data the output flags for which have been set to 1, the data A1, B1, C1, D1 and E2, only are sent to the sanding control unit 6. (step S62)

A modification of the data processings in the mark detecting sections 51 to 53 which enables wet-sanding a plurality of defetive parts at one time will be described with reference to FIGS. 14 and 15, hereinbelow. Since the processings in the mark detecting sections 51 to 53 are the same, only the data processing in the mark detecting section 51 will be described, hereinbelow.

In this modification, a plurality of defect marks of the same shape in an area which can be included in the coverage of the sanding tool T1 are extracted. The term "coverage of the sanding tool T1" means the area which the sanding tool T1 can sand at one time. The shape of the coverage of the sanding tool T1 is set to be a circle, rectangle, ellipsoid or the like depending on the shape of the sanding tool, and the size of the coverage is changed according the grade of sanding required.

Figure 14:
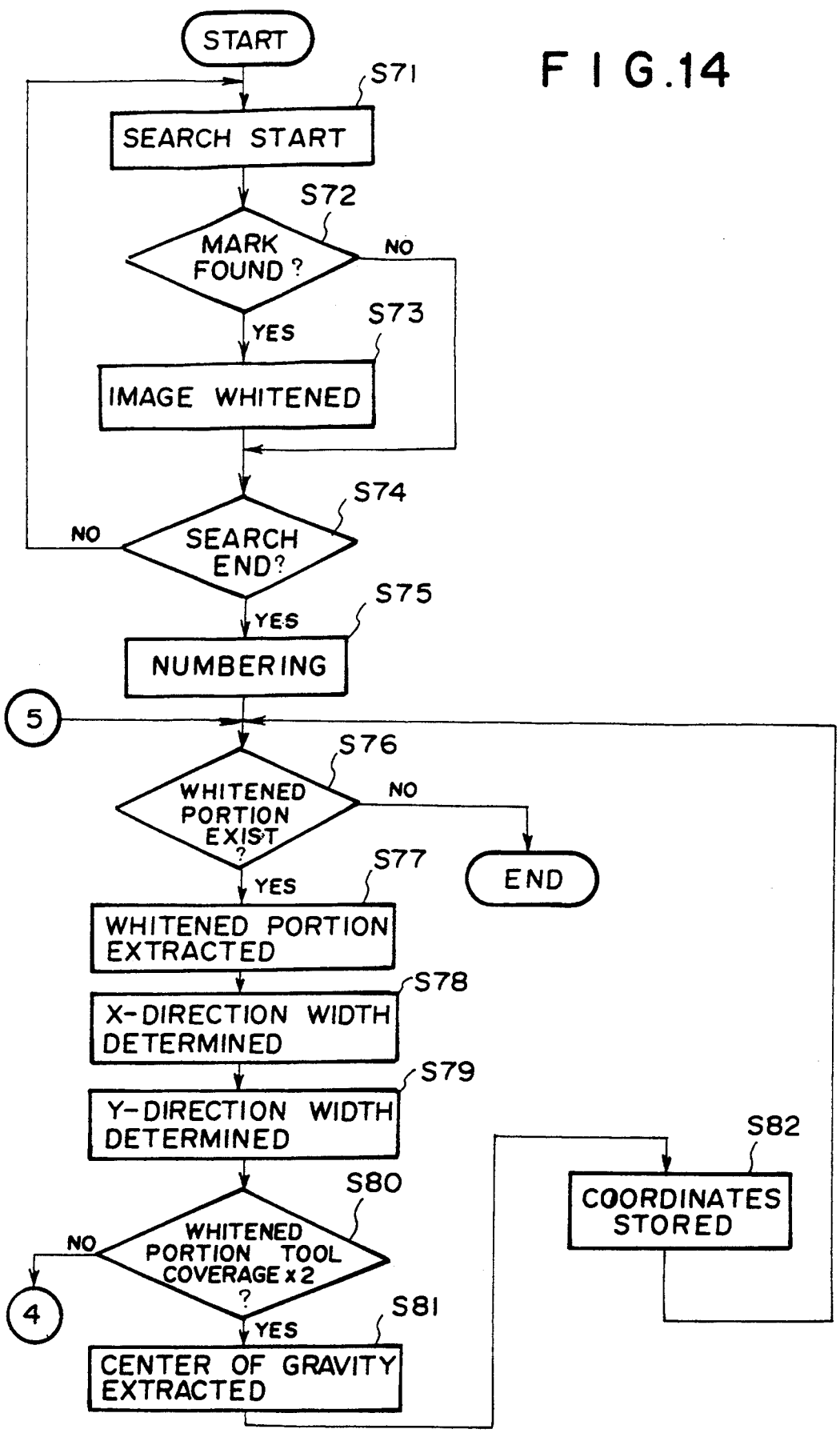
Figure 15:
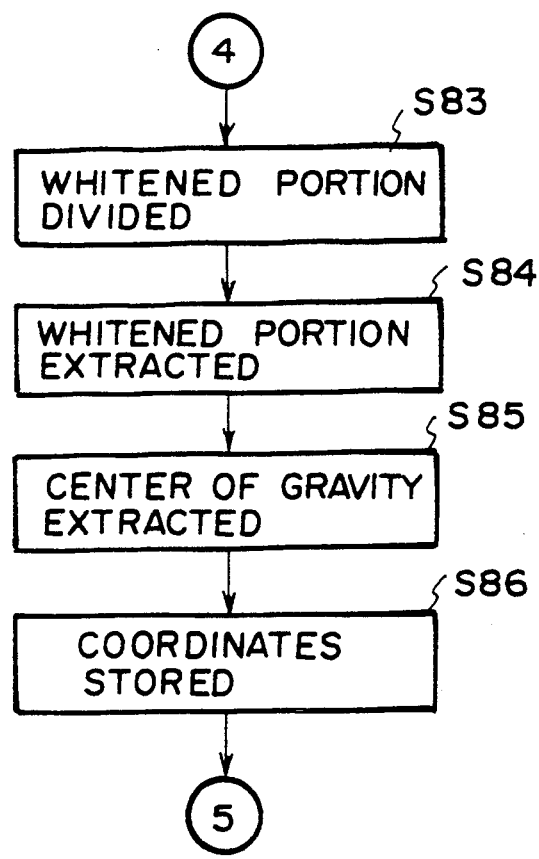

In FIG. 14, when the vehicle body 1 is set in the detecting position, the mark detecting robot R1 is actuated to start searching the detecting division of the smallest number for the defect marks by the detecting cameras S1. (step S71) When a first defect mark is found in an image of a detecting division, a part of the image of the defective detecting division is whitened in an area which corresponds to the coverage of the sanding tool T1, which is determined depending on the grade of sanding required represented by the shape of the first defect mark, in shape and size centered on the coordinates of the first defect mark. (steps S72 and S73) Thereafter, .defect marks which are the same as the first defect mark is searched for in the image of the detecting division, and when another or a second defect mark which is the same as the first defect mark is found in the image of the detecting division, another part of the image is whitened in an area which corresponds to the coverage of the sanding toot T1 in shape and size centered on the coordinates of the second defect mark. In this manner, parts of the image corresponding to all the defect marks having the same shape as the first defect mark in the detecting division are whitened and the image is stored. (step S74)

Then the whitened portions are numbered. In the case where a plurality of whitened portions are linked together, the whitened portions are numbered as one. (step S75)

Thereafter, the numbered whitened portions are extracted one by one in the order of the number and the widths of each whitened portion in x-direction and y-direction are determined. (steps S76 to S79) Then it is determined whether the width of each whitened portion in x-direction is not larger than double of the width of the coverage of the sanding tool T1 in x-direction and whether the width of each whitened portion in y-direction is not larger than double of the width of the coverage of the sanding tool T1 in y-direction. (step S80) Since each whitened portion is originally (before linked) centered on the defect mark or the defetive part to be sanded, the plurality of the defetive parts in the linked whitened portion fall in the coverage of the sanding tool T1 and can be sanded at one time by positioning the sanding tool T1 in alignment with the center of gravity of the linked whitened portion so long as the width of the linked whitened portion in x-direction is not larger than double of the width of the coverage of the sanding tool T1 in x-direction and the width of linked whitened portion in y-direction is not larger than double of the width of the coverage of the sanding tool T1 in y-direction. Accordingly, when it is determined in step S80 that the width of the linked whitened portion in x-direction is not larger than double of the width of the coverage of the sanding tool T1 in x-direction and the width of linked whitened portion in y-direction is not larger than double of the width of the coverage of the sanding tool T1 in y-direction, the center of gravity of the whitened portion is calculated and stored. (steps S81 and S82)

Thereafter, step S76 and the steps following step S76 are repeated for the other whitened portions.

On the other hand, when it is determined in step S80 that the width of the linked whitened portion in x-direction is larger than double of the width of the coverage of the sanding tool T1 in x-direction and/or the width of linked whitened portion in y-direction is larger than double of the width of the coverage of the sanding tool T1 in y-direction, the linked whitened portion is divided on the stored image into portions each of which has a width in x-direction not larger than double of the width of the coverage of the sanding tool T1 in x-direction and a width in y-direction not larger than double of the width of the coverage of the sanding tool T1 in y-direction, and then the coordinates of the center of gravity of each divided portion are calculated and stored. (steps S83 to S86) Thereafter, step 876 and the steps following step S76 are repeated for the other whitened portions.

Thereafter steps S71 to S86 are repeated for the defect marks of the other two different shapes. Further, when all the defect marks in the detecting division are thus processed, the same steps are performed for another defective detecting division.

Another modification of the data processing in the mark detecting sections 51 to 53 which enables wet-sanding a plurality of defetive parts at one time will be described with reference to FIG. 16.

In this modification, whether a plurality of defective parts can be sanded at one time is determined through the coordinates of the defect marks representing the defective parts. Since the processings in the mark detecting sections 51 to 53 are the same also in this modification, only the data processing in the mark detecting section 51 will be described, hereinbelow.

Figure 16:
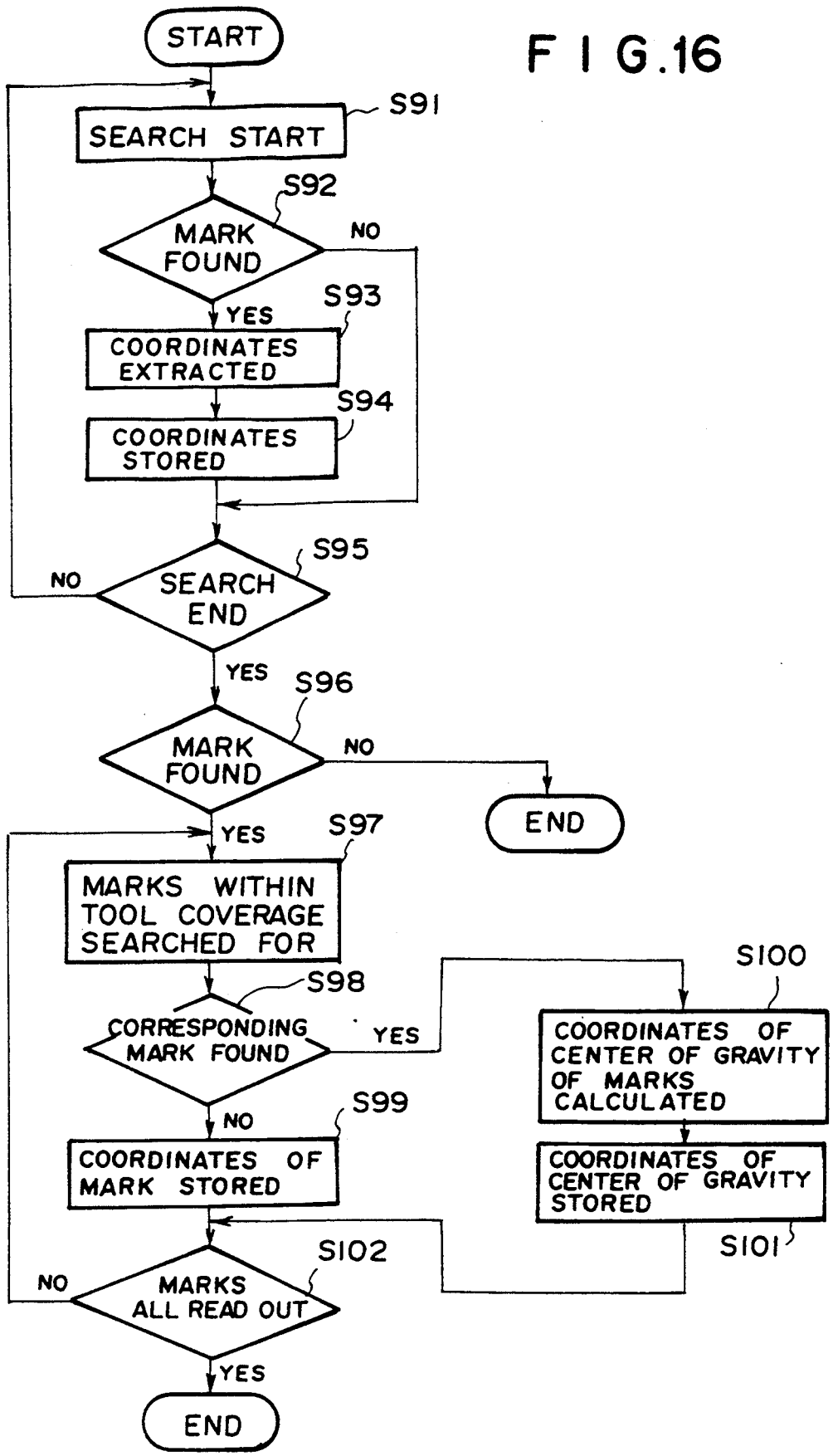
FIG. 16 is a flow chart for illustrating another modification of the mark detecting operation.

In FIG. 16, when the vehicle body 1 is set in the detecting position, the mark detecting robot R1 is actuated to start searching the detecting division of the smallest number for the defect marks by the detecting camera S1. (step S91) When defect marks are found in the detecting division, the defect marks are classified into three groups according to their shapes, i.e., the grades of sanding required, and the x-coordinates and y-coordiantes of the respective defect marks are stored in order of the value of the x-coordinate by group. (steps S92 to S94)

After all the detecting divisions are searched for the defect mark, it is determined whether there was found a defect mark. (steps S95 and S96) When it is determined that the defect marks were found, the coordinates of the detected defect marks are successively read out in order of the value of the x-coordinates by group in each defective detecting division, and defect marks which are the same in shape as the defect mark read out and are within the width in x-direction of the coverage of the sanding tool from each defect mark read out and within the width in y-direction of the coverage of the sanding tool from the defect mark read out are searched for. When there is no corresponding defect mark, the coordinates of the defect mark read out are stored as they are, (steps S97 to S99) On the other hand, when there are found one or more corresponding defect marks, the x-coordinate and the y-coordinate of the center of gravity of the defect marks are calculated according to the following formulae and stored. (steps S98, S100 and S101)

$$x = \frac{1}{n} \sum_{n=1}^{n} xn$$

$$y = \frac{1}{n} \sum_{n=1}^{n} yn$$

wherein n stands for the number of the defect marks which are the same in shape as the defect mark read out and are within the width in x-direction of the coverage of the sanding tool from each defect mark read out and within the width in y-direction of the coverage of the sanding tool from the defect mark read out. Steps S97 to S101 are repeated for all the defect marks by group in each detecting division and the data which have been stored are sent to the sanding control unit 6 after all the defect marks detected are read out. (step S102)

As can be understood from the description above, in accordance with this embodiment, even a fine defective part such as a pin hole can be surely detected since the inspectors M1 and M2 visually inspect the coating on the surface of the vehicle body 1, and at the same time, since the inspectors M1 and M2 have only to mark the defective part with a predetermined defect mark, the time for which the vehicle body 1 must be stopped at each station can be shortened and the possibility of the operator inputting wrong information of the defective part can be suppressed.

Figure 17:
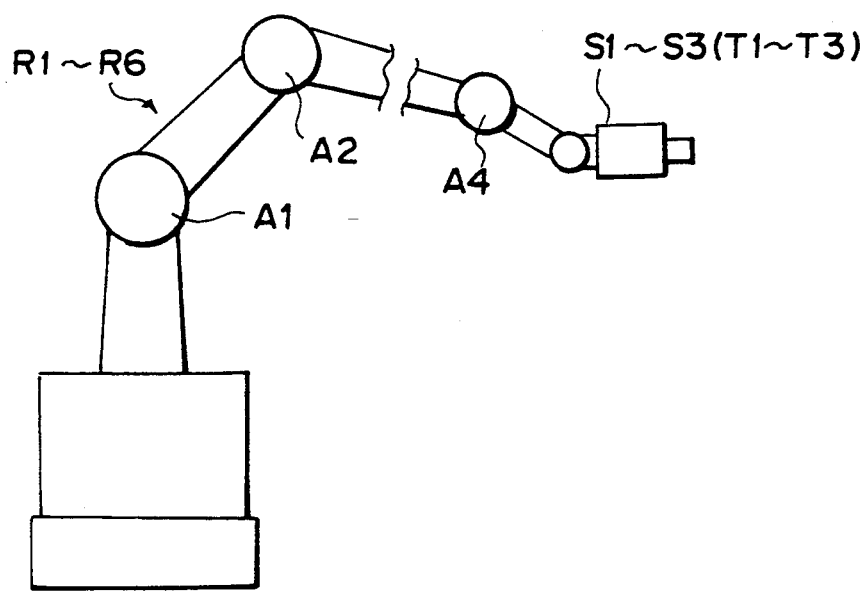
FIG. 17 is a view showing an example of robots.

Preferably the mark detecting robots R1 to R3 and the sanding robots R4 to R6 are of the same type such as shown in FIG. 17. If the robots are of the same type, they take the same actions for given control data. Accordingly, by teaching the mark detecting robots R1 to R3 to conform to the surfaces of the vehicle body 1 in moving the detecting cameras S1 to S3 to the detecting points and by using the teaching data for the mark detecting robots R1 to R3 as the control data for the sanding robots R4 to R6, the sanding robots R4 to R6 can move the sanding tools T1 to T3 to the centers of the defective detecting divisions.

An example of data processing between mark detecting robots R1 to R3 and the sanding robots T4 to R6 will be described in conjunction with the mark detecting robot R1 and the sanding robot R4, hereinbelow.

In the teaching operation of the mark detecting robot R1, the coordinate data (x, y, z) of the detecting point (the center of the detecting division), the position data ($\alpha$, $\beta$, $\gamma$) of the mark detecting camera S1 and the angular data ($\theta1$, $\theta2$, ..., $\theta4$) of the respective arms A1, A2, ..., and A4 of the robot R1 (FIG. 17) which are set for each detecting division as shown in table 3 are stored in the detecting robot control section 55, and then these data are input into the sanding robot control section 61 by way of a floppy disk or the like. The coordinates (x, y, z) of the detecting points are defined on the basis of the first reference point O1 the position of which relative to the vehicle body 1 is equal to the position of the second reference point O2 relative to the vehicle body 1. Accordingly, the sanding robot R4 can move the sanding tool T1 to the detecting points of the respective defective detecting divisions in positions which are proper to sand the defetive parts designated by the defect marks by simply inputting the numbers of the defective detecting divisions into the sanding robot control section 61.

TABLE 3

| No. | x | y | z | $\alpha$ | $\beta$ | $\gamma$ | $\theta1$ | $\theta2$ | ... | $\theta4$ |
|---|---|---|---|---|---|---|---|---|---|---|
| 1 | 200 | 100 | 150 | 30 | 10 | 60 | 20 | 15 | ... | 30 |
| 2 | 300 | 150 | 150 | 20 | 15 | 50 | 20 | 20 | ... | 15 |
| . | . | . | . | . | . | . | . | . | | . |
| . | . | . | . | . | . | . | . | . | | . |
| 150 | 250 | 100 | 120 | 30 | 15 | 45 | 15 | 20 | ... | 20 |

No. = number of detecting divisions

Otherwise, only the data for the defective detecting divisions, the coordinate data (x, y, z) of the detecting point, the position data ($\alpha$, $\beta$, $\gamma$) of the mark detecting camera S1 and the angular data ($\theta1$, $\theta2$, ..., $\theta4$) of the respective arms A1, A2, ..., and A4, may be sent to the sanding robot control sections 61 to 63 together with the numbers of the defective detecting divisions before wet sanding of the defective parts is initiated. In this case, though the amount of data to be transferred to the sanding robot control sections 61 to 63 for each of the defective detecting divisions, it is not necessary to input the data for all the detecting divisions into the sanding robot control sections in advance.

In the embodiment described above, each of the sanding tools T1 to T3 is once moved to the detecting point of each defective detecting divisions and then moved to the defective parts designated by the coordinates of the defect mark which are defined on the basis of the detecting point in the detecting division. This can simplify the data to be transferred between the mark detecting robot control sections and the sanding robot control sections as compared with the case where the sanding robots are controlled by the coordinate data which designate the positions of the defective parts as coordinates defined on the basis of an origin which is set for the entire surface of the vehicle body 1.

When the coverage of each of the sanding tools T1 to T3 is substantially equal to the area of each detecting division, all the defective parts in each defective detecting division can be sanded at one time by centering the coverage of the sanding tool on the detecting point of the defective detecting division and accordingly, the sanding tool need not be moved to the position of the defect mark after it is once moved to the detecting point as in the aforesaid embodiment.

Further since the sanding robot control sections 61 to 63 are given the sanding position of the sanding tool in each of the detecting divisions such as the angular data ($\theta 1, \theta 2, \ldots, \theta 4$) of the respective arms A1, A2, ..., and A4, the sanding tool can be properly applied to the defective part.

In the embodiment described above, each of the mark detecting robots R1 to R3 corresponds to one of the sanding robots R4 to R6. That is, each sanding robot corrects the defective parts which are found by one of the mark detecting robots. However, since the working efficiency of the sanding robots is higher than that of the mark detecting robots, it is preferred that one sanding robot corrects the defective parts which are found by a plurality of the mark detecting robots.

Now another embodiment of the present invention in which a pair of mark detecting robots search the surface of the vehicle body for defective parts and a single sanding robot wet-sands the defective parts found by the mark detecting robots will be described with reference to FIGS. 18 to 31, hereinbelow.

Figure 18:
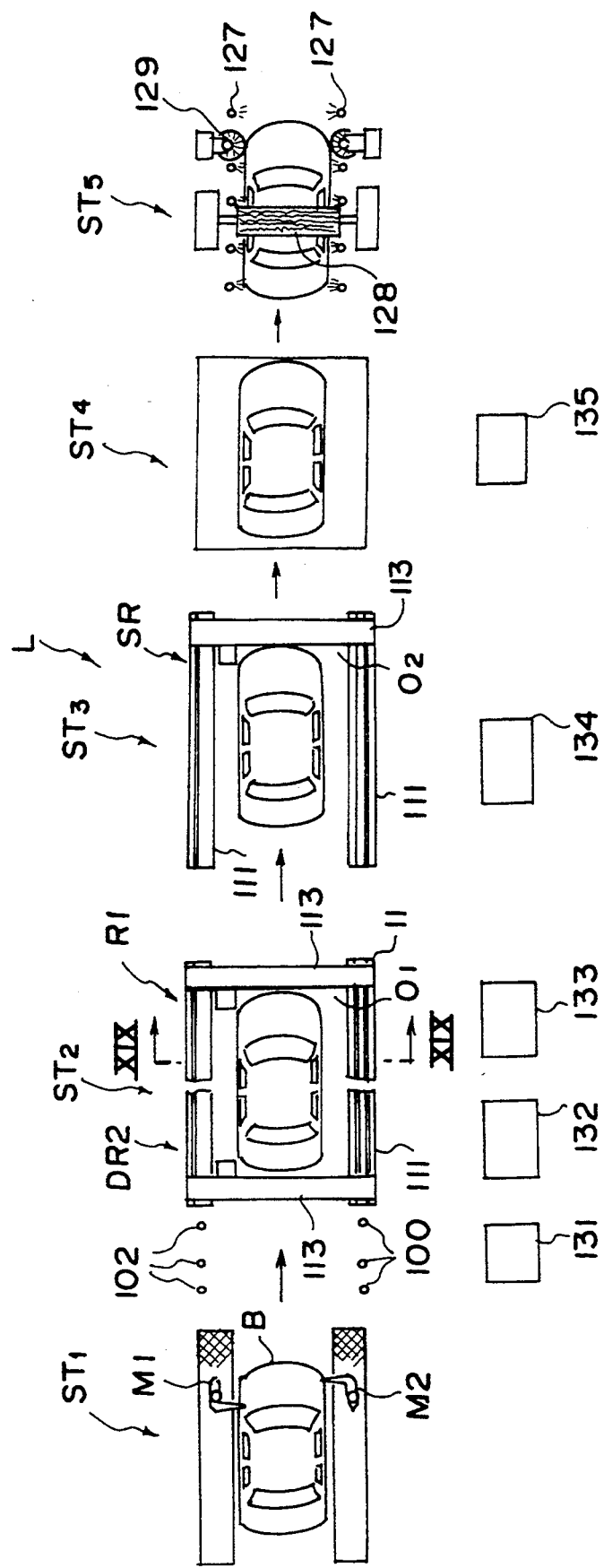
FIG. 18 is a schematic view of another example of a wet sanding line for carrying out the method of the present invention.

In FIG. 18, a wet sanding line L has a marking station ST1, a mark detecting station ST2, a sanding station ST3, an auxiliary sanding station ST4 and a water washing station ST5, and a vehicle body B which has been provided with an intercoating is conveyed from station to station.

Inspectors M1 and M2 are posted at the marking station ST1 and visually inspect the coating on the surface of the vehicle body B. When the inspectors M1 and M2 find a defective part, such as a part having a pin hole or a part having a foreign matter adhering thereto, they mark the defective part with a predetermined defect mark M which is determined according to the degree of defect of the defective part. As in the preceding embodiment, each inspector marks the defective part with a circle when the defective part requires heavy sanding (sanding grade 1), a triangle when the defective part requires middle sanding (sanding grade 2) and with a square when the defective part requires light sanding (sanding grade 3).

Vehicle type sensors 103 each comprising a light emitting section 101 and a light receiving section 102 are provided on the upstream side of the mark detecting station ST2, and first and second mark detecting robots DR1 and DR2 are disposed at the mark detecting station ST2. The first and second mark detecting robots DR1 and DR2 are six-axial robots of the same type, and the former searches the front half of the vehicle body surface for the defect mark M and the latter searches the rear half of the vehicle body surface for the defect mark M.

A single sanding robot SR which is of the same time as the mark detecting robots DR1 and DR2 is disposed at the sanding station ST3. A first reference point O1 is set at the mark detecting station ST2 and a second reference point O2 is set at the sanding station ST3. The vehicle body B is set at the mark detecting station ST2 and the sanding station ST3 so that the position of the vehicle body B relative to the first reference point O1 at the mark detecting station ST2 is equal to the position of the vehicle body B relative to the second reference point O2 at the sanding station ST2.

At the auxiliary sanding station ST4, operators wet-sand a part of the defective parts in case where the defective parts is too large in number for the sanding robot SR to wet-sand all the defective parts in a predetermined time.

At the water washing station ST5, there are provided a plurality of water showers 127 and brushes 128 and 129 and the vehicle body B is washed after the wet sanding step.

The mechanical structure of the mark detecting robots DR1 and DR2 and the sanding robot SR will be described with reference to FIG. 19, hereinbelow. Since the robots DR1, DR2 and SR are basically of the same structure, only the first mark detecting robot will be mainly described.

Figure 19:
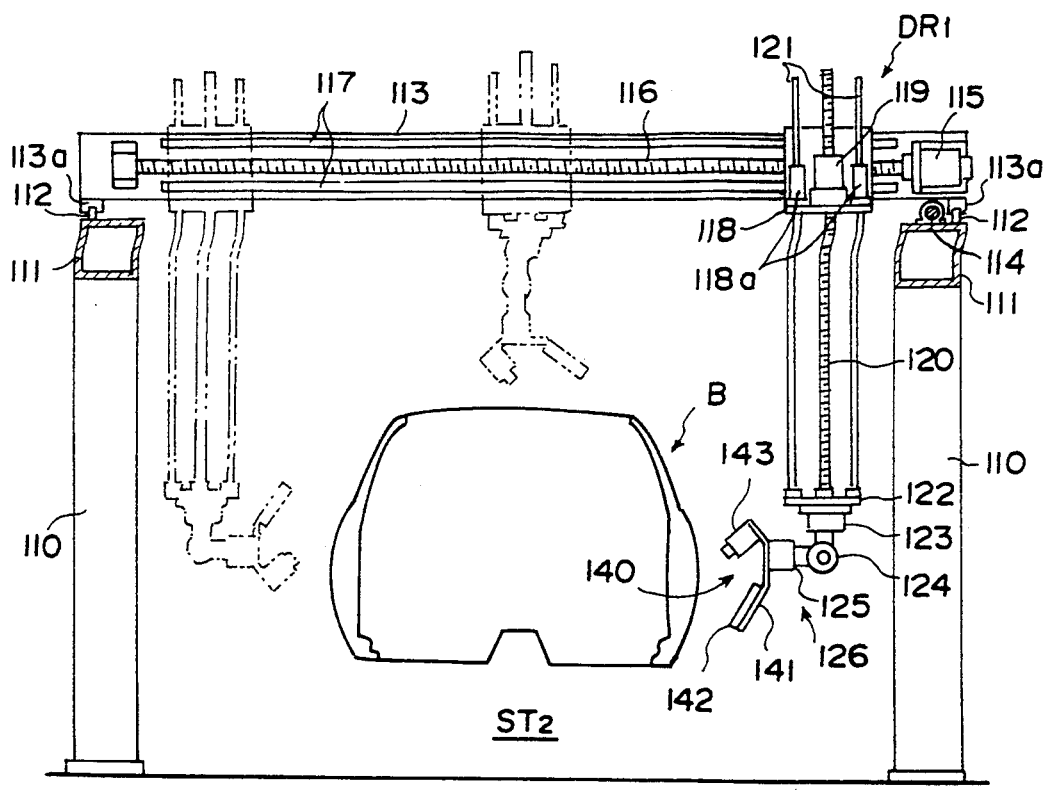
FIG. 19 is a cross-sectional view taken along line XIX—XIX in FIG. 18.

In FIG. 19, columns 110 are erected at left and right front corners and left and right rear corners at the mark detecting station ST2. Left and right beams 111 are fixed to the tops of the left side columns 110 and to the tops of the right side columns 110 to extend in the longitudinal direction. A pair of guide rails 112 are respectively mounted on the upper surfaces of the left and right beams 111 to extend in the longitudinal direction. A movable frame 113 transversely extends between the left and right beams 111, and bearings 113a on left and right ends of the movable frame 113 are engaged with the guide rails 112 to be movable along the guide rails 112, whereby the movable frame 113 is supported on the beams 111 to be movable back and forth in the longitudinal direction.

A ball screw shaft 116 is mounted on the rear side face of the movable frame 113 to extend in the transverse direction and is revolved by a servomotor 115. A pair of upper and lower guide rails 117 are mounted on the rear side face of the movable frame 113 to extend in parallel to the ball screw shaft 116 above and below the same. A movable table 118 is mounted on the guide rails 117 to be movable along the guide rails 117 and is driven back and forth along the guide rails 117 by the servomotor 115 by way of a ball screw nut (not shown) in mesh with the ball screw shaft 116. A pair of rod guides 118a and a ball screw nut 119 are vertically mounted on the movable table 118. A pair of guide rods 121 vertically extend through the respective rod guides 118a and a ball screw shaft 120 vertically extends in mesh with the ball screw nut 119. A hand support member 122 is fixed to the lower ends of the guide rods 121 and the ball screw shaft 120 to be moved up and down by driving the ball screw nut 119.

A hand 126 is connected to the hand support member 122 by way of a driving joint portion 123 for rotating the hand 126 about a vertical axis, a driving joint portion 124 for rotating the hand 126 about a horizontal axis and a driving joint portion 125 for rotating the hand 126 about a hand axis.

Figure 20:
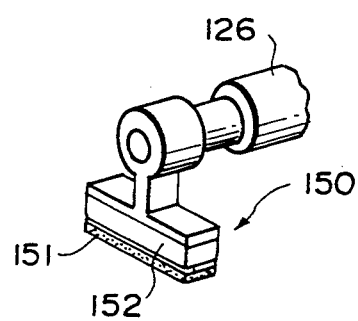
FIG. 20 is a fragmentary perspective view of the sanding tool.

A mark detecting device 140 comprising a light projector 142 and a CCD camera 143 which are mounted on a support member 141 is supported by the hand 126. On the hand 126 of the sanding robot SR is mounted a sanding tool 150 comprising a grindstone 151 and an actuator 152 which oscillates the grindstone 151 in parallel to the surface thereof as shown in FIG. 20.

Each of the mark detecting robots DR1 and DR2 and the sanding robot SR having the structure described above has six degrees of freedom, in x-axis direction (back and forth), y-axis direction (left and right) and z-axis direction (up and down), about the vertical axis, the horizontal axis and the hand axis.

The control system for the mark detecting robots DR1 and DR2 and the sanding robot SR will be described hereinbelow.

Figure 21:
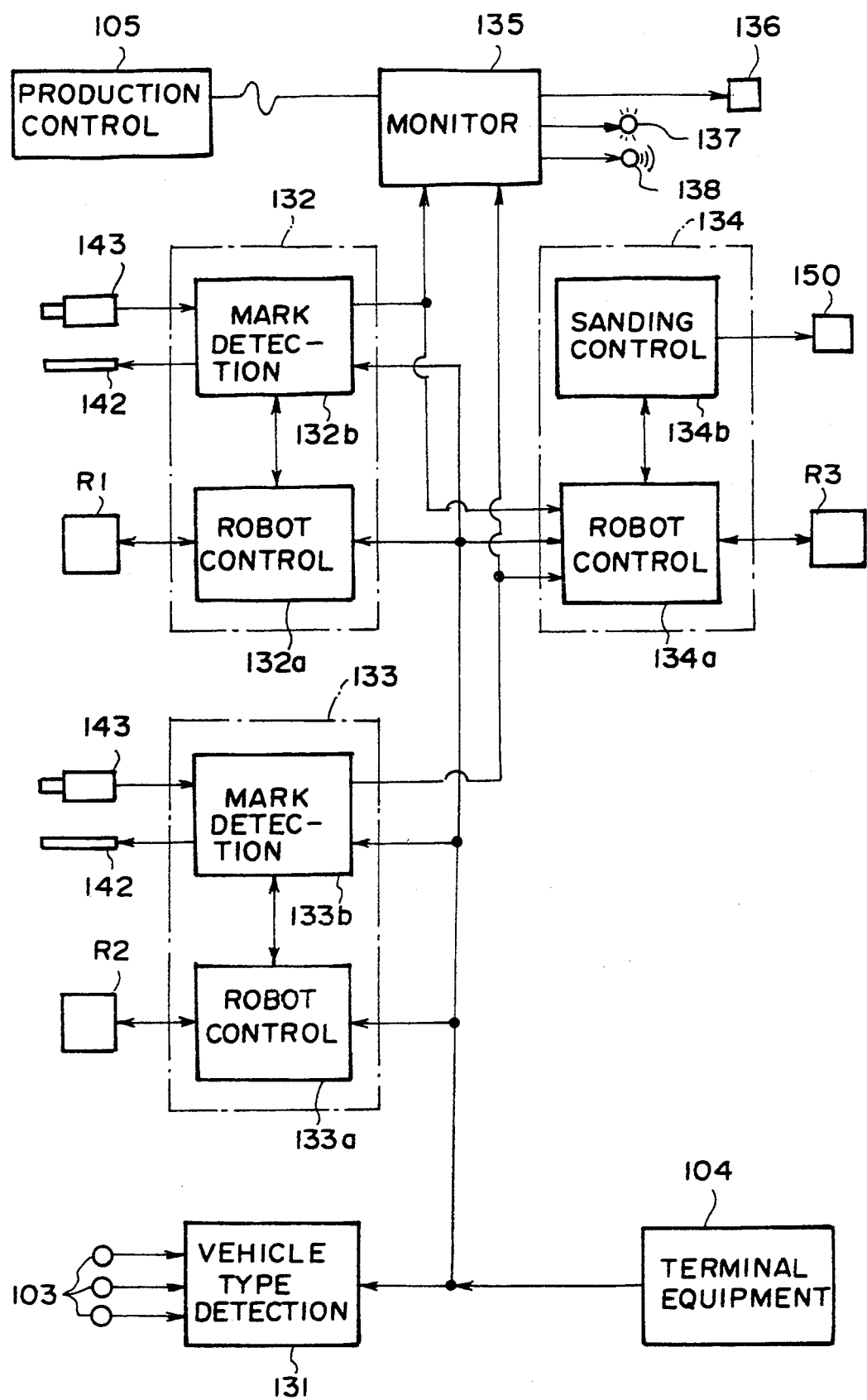
FIG. 21 is a block diagram showing an example of the control system for the wet sanding line.

As shown in FIG. 18, control sections 132 and 133 which respectively control the first and second mark detecting robots DR1 are provided at the mark detecting station ST2 and a control section 134 which controls the sanding robot SR is provided at the sanding station ST3. As shown in FIG. 21, the control section 132 comprises a robot control system 132a for controlling the position of the hand 126 of the first mark detecting robot DR1 and a mark detecting system 132b which processes the image signal from the CCD camera 143 and the control section 133 comprises a robot control system 133a for controlling the position of the hand 126 of the second mark detecting robot DR2 and a mark detecting system 133b which processes the image signal from the CCD camera 143. The control section 134 comprises robot control system 134a for controlling the position of the hand 126 of the sanding robot SR and a tool control section 134b which sets the sanding condition of the sanding tool 150.

The mark detecting station ST2 is further provided with a vehicle type detecting section 131 which detects the type of the vehicle body B through the outputs of the vehicle type sensors 103, and the auxiliary sanding station ST4 is provided with a defect monitoring device 135 which monitors the condition of defective parts on the vehicle body surface. The defect monitoring device 135 controls a CRT display 136 for displaying information on the defective parts, and an alarm lamp 137 and an alarm buzzer 138 which give the alarm when a significant number of defective parts are detected.

Each of the vehicle type detecting section 131, the robot control systems 132a and 133a, the mark detecting systems 132b and 133b, the robot control system 134a, the tool control system 134b and the defect monitoring device 135 has a microcomputer including a, CPU, a ROM and a RAM, an input/output interface and the like, and the vehicle type detecting section 131, the robot control systems 132a and 133a, the mark detecting systems 132b and 133b, the robot control system 134a, the tool control system 134b and the defect monitoring device 135 are interconnected by buses, and are connected to a production information network terminal equipment 104 which receives production information from external systems, and the defect monitoring device 135 is connected to a production control computer 105 which controls production of the vehicles.

A control program for vehicle type detection is stored in the ROM of the vehicle type detecting section 131, control programs for teaching of the mark detecting robots DR1 and DR2, feedback control of the six-axis servomotor and mark detection by vehicle type are stored in the ROMS of the robot control systems 132a and 133a, and control programs for imaging processing for detecting the defect mark M and its position on the basis of the image signal are stored in the ROMs of the mark detecting systems 132b and 133b. Further, programs for feedback control of the six-axis servomotor and sanding control by the vehicle type is stored in the ROM of the robot control system 134a, and a program for tool control is stored in the tool control system. A defect monitoring control program is stored in the ROM of the defect monitoring device 135.

Figure 22:
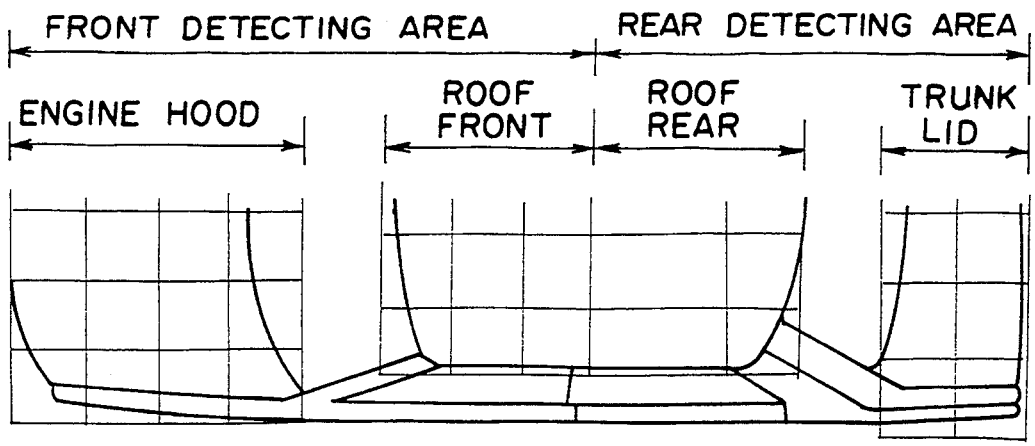
FIGS. 22 and 23 are views for illustrating setting of the detecting divisions in the example shown in FIG. 18.
Figure 23:
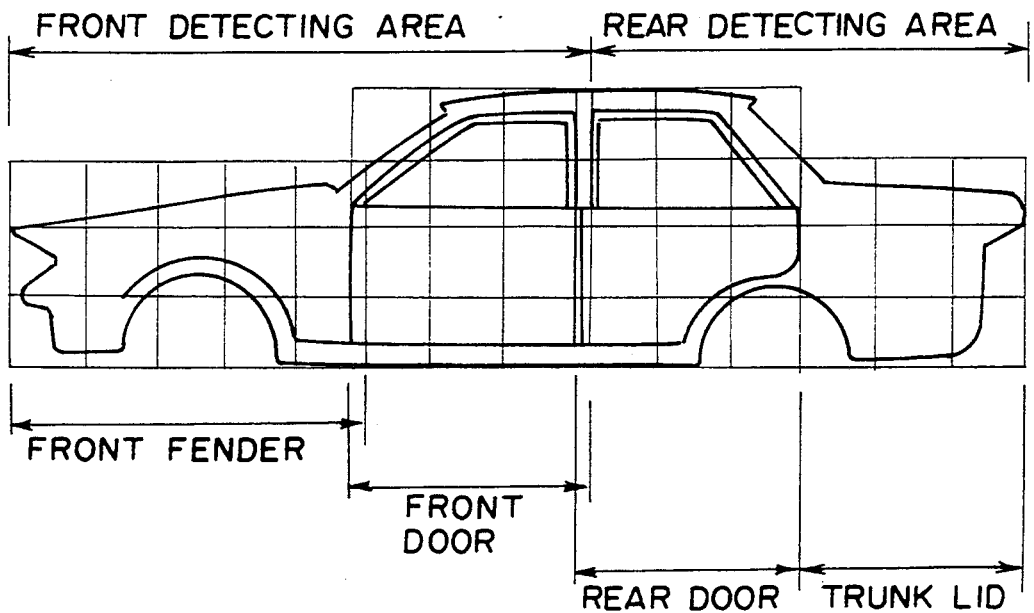

The surface of the vehicle body B is divided into front and rear detecting areas which are searched for the defect mark M respectively by the first mark detecting robot DR1 and the second mark detecting robot DR2 as shown in FIGS. 22 and 23 and table 4. The front detecting area is further divided into six detecting sections, right front door, right front fender, engine hood, left front fender, left front door and roof front part, and the rear detecting area is further divided into six detecting sections, left rear fender, left rear door, roof rear part, right rear fender, right rear door and trunk lid.

TABLE 4

| D/A | DETECTING SECTION | D/D NO. | D/O | S/O | NIG | C/P NO. |
|---|---|---|---|---|---|---|
| FRONT | RIGHT FRONT DOOR | 1~20 | 1 | 6 | A | 244 |
| DETECTING | RIGHT FRONT FENDER | 21~40 | 2 | 1 | A | 245 |
| AREA | ENGINE HOOD | 41~60 | 3 | 2 | D | 246 |
|  | LEFT FRONT FENDER | 61~80 | 4 | 3 | B | 247 |
|  | LEFT FRONT DOOR | 81~100 | 5 | 4 | B | 248 |
|  | ROOF FRONT | 101~120 | 6 | 5 | C | 249 |
| REAR | LEFT REAR FENDER | 121~140 | 1 | 10 | B | 250 |
| DETECTING | LEFT REAR DOOR | 141~160 | 2 | 9 | B | 251 |
| AREA | ROOF REAR | 161~180 | 3 | 8 | C | 252 |
|  | RIGHT REAR DOOR | 181~200 | 4 | 7 | A | 253 |
|  | RIGHT REAR FENDER | 201~220 | 5 | 12 | A | 254 |
|  | TRUNK LID | 221~240 | 6 | 11 | E | 255 |

D/A = DETECTING AREA
D/D NO. = NUMBER OF DETECTING DIVISION
D/O = DETECTING ORDER
S/O = SANDING ORDER
NIG = NON-INTERFERENCE GROUP
C/P NO. = NUMBER OF CLEARANCE POINT

As shown in table 4, detecting order is set for the detecting sections in the front rear detecting areas in order to move the hands 126 of the first and second mark detecting robots DR1 and DR2 without interference with each other, the detecting divisions are numbered from 1 to 240, and sanding order is set for the detecting sections.

Further, the detecting sections are divided into five groups (group A to group E) so that the hands 126 of the robots cannot interfere with the vehicle body B so long as the hands 126 move in the detecting sections in each group. For example, the right front door and the right front fender are substantially in one plane and accordingly, the hands 126 of the robots cannot interfere with the vehicle body B when the hands 126 move in the plane from one of them to the other according to the detecting order and the numbers of the detecting divisions and they are in one group, i.e., group A. The groups will be referred to as "the non-interference groups", hereinbelow. On the other hand, for example, the right front fender and the engine hood are in different planes, and accordingly the hands 126 of the robots interfere with the vehicle body B when the hands 126 move from one of them to the other, and the right front fender is in the non-interference group A whereas the engine hood is in the non-interference group D.

Figures 24, 27:
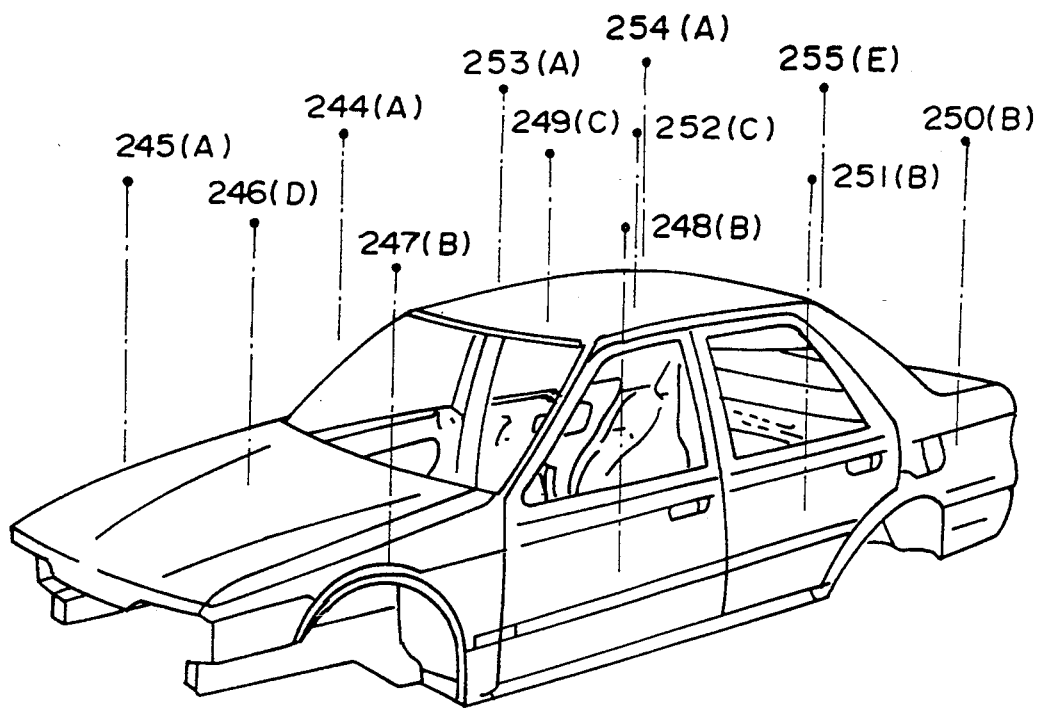
FIG. 24 is a schematic perspective view showing the clearance points.
FIG. 27 is a view for illustrating an example the detecting data.

In order to avoid interference of the hands 126 with the vehicle body B, the hands 126 are moved from one non-interference group to another via a clearance point which is set in relation with each detecting section. As shown in FIG. 24, a clearance point is set for each detecting section at a distance above the detecting section and the clearance points are numbered from 244 to 255.

The numbers of the detecting divisions, the detecting order, the sanding order, the non-interference groups and the numbers of the clearance points which are determined in the manner described above are stored in the detection control programs for the mark detecting robots DR1 and DR2 and the sanding control program for the sanding robot SR as tables by vehicle type.

The clearance point need not be set for each detecting section but may be set for each non-interference group.

Teaching for the mark detecting robots will be described hereinbelow. The teaching is performed when a new type of vehicle body B is fed to the wet sanding line L. Since the teaching for the first and second mark detecting robots DR1 and DR2 is performed in the same manner, description will be made only on the first mark detecting robot DR1.

When teaching the first mark detecting robot DR1, the vehicle body B is positioned in a predetermined position relative to said first reference point O1 at the mark detecting station ST2, and the six axes of the first mark detecting robot DR1 are initialized. Then the camera 143 is moved to the detecting point in the No. 1 detecting division by way of the hand 126 and the position of the hand 126 is finely adjusted so that the center of the detecting range in the field of view of the camera 143 coincides with the center of the No. 1 detecting division, i.e., the detecting point of the No. 1 detecting division. Thereafter, the positions of the six axes are taught to the robot control system 132a. At this time, the camera 143 is positioned at a predetermined distance from the vehicle body B. In this manner, the camera 143 is moved from detecting division to detecting division and the positions of the six axes for the respective detecting divisions are taught to the robot control system 132a.

When the hand 126 is moved, for instance, from the right front fender to the engine hood, the hand 126 is once moved to the No. 245 clearance point for the right front fender and the position of the No. 245 clearance point is taught to the robot control system 132a. Then the hand 126 is moved to the No. 246 clearance point for the engine hood and the position of the No. 246 clearance point is taught to the robot control system 132a.

The teaching data for the first mark detecting robot DR1 are stored in the RAM of the robot control section 132a. The teaching for the second mark detecting robot DR2 is performed in the similar manner and the teaching data for the second mark detecting robot DR2 are stored in the RAM of the robot control system 133a. The data for the first and second mark detecting robots DR1 and DR2 are transferred to the RAM of the robot control system 134a for the sanding robot SR and are stored therein.

Since the robots DR1, DR2 and SR are of the same type and at the same time, the position of the vehicle body S in the mark detecting position relative to the coordinate system of the mark detecting robots DR1 and DR2 is equal to that in the sanding position relative to the coordinate system of the sanding robot SR, the teaching data for the mark detecting robots DR1 and DR2 can be used for the sanding robot SR.

The mark detecting control and the image processing control will be described with reference to the flow charts shown in FIGS. 25 and 26, hereinbelow.

Figure 26:
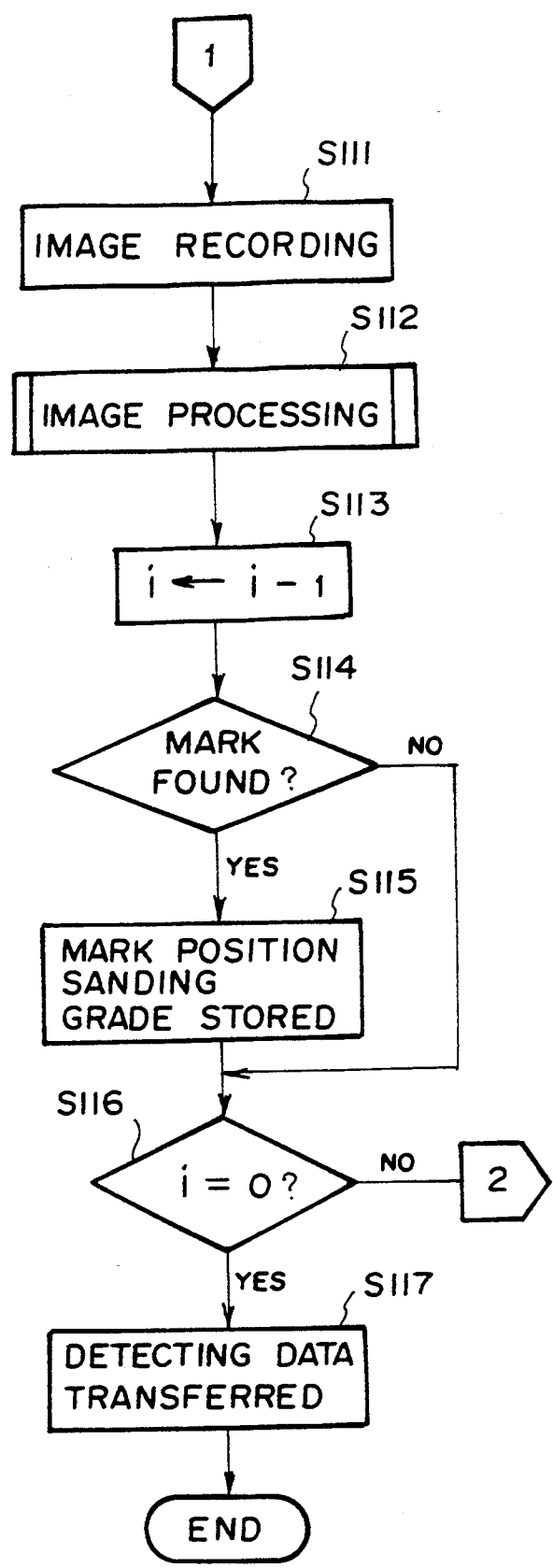
FIG. 26 is a flow chart for illustrating the image processing.

The flow chart shown in FIG. 25 shows the routine for the mark detecting control and the flow chart shown in FIG. 26 shows the routine for the image processing control associated with the mark detecting control.

Until the vehicle body B is set to the predetermined position, i.e., the mark detecting position, at the mark detecting station ST2, the first mark detecting robot DR1 waits at the first reference point O1, and when the vehicle body B is set to the mark detecting position, a counter is set to 120. (steps S10 and S102) Then the teaching data of the No. 1 detecting division are read in step S103 and then the non-interference group of the NO. 1 detecting division is read in step S104. Then in step 105, it is determined whether the non-interference group of the present detecting division is the same as that of the preceding detecting division. In the case of NO. 1 detecting division, this determination is made for the first time and accordingly the answer is set to be YES. Thereafter, the camera 143 is moved to the detecting point of the No. 1 detecting division according to the teaching data of the No, 1 detecting division and the position of the mark detecting device 140 is controlled according to the teaching data. (step S110)

Then the image of the No. 1 detecting detecting division is recorded in step S111. The mark detecting system 132b converts the image signal of the image into a digital signal, processes it in a predetermined manner, and then determines whether there is a defect mark M and calculates the kind and position of the defect mark M. (step S112) Then after the counter is decremented by one in step S113, it is determined in step S114 whether a defect mark M was found in the No. 1 detecting division. When it is determined that a defect mark M was found in the No. 1 detecting division, the position and the kind of the defect mark M (the sanding grade) are stored as the detecting data. That is, as shown in FIG. 27, the number which represents the order in which the defect mark M was found, the x-coordinate and the y-coordinate of the defect mark M defined as the origin on the detecting point of the detecting division, and the sanding grade represented by the shape of the defect mark M are stored as the detecting data. Also the type of the vehicle body B and the body number (fed from the terminal equipment 104) are stored as the detecting data.

After step S115 or when it is determined in step S114 that no defect mark M was found in the No. 1 detecting division, it is determined in step 116 whether the value of the counter is 0. In this manner, the NO. 2 to No. 40 detecting divisions are searched for the defect mark M and the detecting data are stored while the camera 143 is moved from detecting point to detecting point.

After search of the No. 40 detecting division is ended, the teaching data of the No. 41 detecting division in the engine hood is read. (step S103) Then the noninterference group of the NO. 41 detecting division is read in step S104, and then in step S105, it is determined whether the non-interference group of the present detecting division is the same as that of the preceding detecting division. In this case, since the non-interference group of the NO. 41 detecting division, group D, is different from that of the No. 40 detecting division, group A, the teaching data of the clearance point for the No. 40 detecting division, No. 245 clearance point, are read in step S106. Then the teaching data of the clearance point for the No. 41 detecting division, No. 245 clearance point, are read in step S107. Thereafter the hand 126 which has been positioned to conform to the No. 40 detecting division is moved to the No. 245 clearance point (step S108) and to the No. 246 clearance point (step S109) and to the detecting point of the No. 41 detecting division (step S110) By moving the hand 126 via the clearance points, interference of the hand 126 with the vehicle body B can be prevented.

In this manner, all the detecting divisions are searched for the defect mark M and the detecting data are stored while the camera 143 is moved from detecting point to detecting point and is moved via the clearance points when it is moved from one non-interference group to another. After search of all the detecting divisions in the front detecting area is completed, the detecting data which have been arranged in the order in which the defect marks M were found such as shown in table 5 are transferred from the mark detecting system 132b to the robot control system 134a for the sanding robot SR and the defect monitoring device 135. (step S117) Thereafter the first mark detecting robot DR1 returns to the first reference point O1. Search of the rear detecting area for the defect mark M is performed by the second mark detecting robot DR2 simultaneously with search of the front detecting area and the detecting data such as shown in table 6 are transferred to the robot control system 134a for the sanding robot SR and the defect monitoring device 135 also from the mark detecting system 133b.

TABLE 5 vehicle type: ..., body No. ...

| detecting division No. | data |
|---|---|
| 1 | 15 | ... |
| 2 | 30 | ... |
| 3 | 50 | ... |
| 4 | 90 | ... |

TABLE 6 vehicle type: ..., body No. ...

| detecting division No. | data |
|---|---|
| 1 | 150 | ... |
| 2 | 155 | ... |

The routine for the sanding control will be described with reference to the flow chart shown in FIG. 28, hereinbelow.

This control is initiated when the data are transferred from the mark detecting systems 132b and 133b, and the data from the mark detecting systems 132b and 133b are combined together and are rearranged to conform to the sanding order as shown in table 7. (step S120) Further, clearance points are inserted between the data on the detecting divisions in different non-interference groups as shown in table 8. That is, the non-interference groups of the detecting divisions of the NO. 1 data and the No, 2 data are read and it is determined that the non-interference groups are the same. (step S121) In the data shown in table 7, the non-interference group for the No, 1 data is "A" and that for the No. 2 data is D. In such a case, the numbers of the clearance points for the non-interference group A (245) and the non-interference group D (246) are inserted between the No. 1 data and the No. 2 data as shown in table 8. (steps S122 and S123) In the similar manner, the preceding clearance point and the present clearance point are inserted between all pairs of data on the detecting divisions in different non-interference groups as shown in table 8. (steps S21 to S24)

TABLE 7 vehicle type: ..., body No. ...

| detecting division No. | data |
|---|---|
| 1 | 30 | ... |
| 2 | 50 | ... |
| 3 | 90 | ... |
| 4 | 15 | ... |
| 5 | 150 | ... |
| 6 | 155 | ... |

TABLE 8 vehicle type: ..., body No. ...

| detecting division No. | data |
|---|---|
| 1 | 30 | ... |
| 2 | 245 | — |
| 3 | 246 | — |
| 4 | 50 | ... |
| 5 | 246 | — |
| 6 | 248 | — |
| 7 | 90 | ... |
| 8 | 248 | — |
| 9 | 244 | — |
| 10 | 15 | ... |
| 11 | 244 | — |
| 12 | 251 | — |
| 13 | 150 | ... |
| 14 | 155 | ... |

Then when the vehicle body B is set to the sanding position, the hand 126 of the sanding robot SR is caused to move the sanding toot 150 to the detecting point of the No. 30 detecting division corresponding to the No. 1 data. At this time, the hand 126 is controlled according to the teaching data of the No. 30 detecting division, whereby the sanding tool 150 is properly oriented relative to the vehicle body B. (steps S125 and S126) Then the hand 126 is controlled to move the sanding tool 150 to the position represented by the coordinates of the defect mark M and the sanding grade data are output to the sanding tool control system 134b, which sets the sanding conditions such as the sanding time, sanding pressure and the like according to the sanding grade.

(steps S127 and S128) Then the actuator 152 oscillates the grindstone 151 in parallel to the defective part represented by the defect mark M, whereby the defective part is sanded. (step S129)

In this manner, the hand 126 moves the sanding tool 150 from defective part to defective part in the order of data shown in table 8 and causes the sanding tool 150 to sand the defective parts until sanding of all the defective parts detected is completed. (steps S130-S126-S127-S128-S129) For example, after sanding of the defective part represented by the No. 1 data, the hand 126 moves the sanding tool 150 once to the No. 245 clearance point, then to the No. 246 clearance point and then to the detecting point of the No. 50 detecting division. Thus the hand 126 of the sanding robot SR moves the sanding tool 150 over the entire surface of the vehicle body B without interference with the vehicle body B. After sanding of all the defective parts is completed, the sanding robot SR returns to the second reference point O2.

As can be understood from the description above, in this embodiment, the numbers of the detecting divisions, the detecting order, the sanding order, the non-interference groups, the number of the clearance points and the like are stored in common in the mark detecting control programs for the mark detecting robots DR1 and DR2 and the sanding control program for the sanding robot SR and the data which are the same as the teaching data of the mark detecting robots DR1 and DR2 are transferred to the sanding robot SR. Accordingly, teaching of the sanding robot SR can be omitted.

Further since the data on the defective parts detected by the mark detecting robots DR1 and DR2 are rearranged according to the sanding order and the sanding robot SR is controlled on the basis of the rearranged data, vain movement of the sanding robot SR is reduced and the working efficiency of the sanding robot SR can be increased.

Further, since the hand 126 of each robots is moved from a detecting section in one non-interference group to a detecting section in another non-interference group via clearance points, the hand 126 cannot interfere with the vehicle body B.

The type of vehicle body B may be input into the control sections 132 to 134 from the terminal equipment 104 instead of detecting the vehicle type by the vehicle type detecting section 131. The robot control systems 132a and 133a may be respectively integrated with the mark detecting systems 132b and 132a, and the robot control systems 134a may be integrated with the sanding control system 134b. Further the control sections 132 to 134 may be integrated into a large control unit.

Further, though, in the embodiment described above, one sanding robot is combined with two mark detecting robots, one sanding robot may be combined with three or more mark detecting robots. Further, if desired, it is possible to dispose four mark detecting robots at the mark detecting station and two sanding robots at the sanding station so that each sanding robot is combined with two mark detecting robots. Further, if necessary, three pairs of pressure sensors and strain sensors may be provided in the vicinity of the actuator 152 of the sanding tool 150 to control the grindstone 151 so that it is brought into contact with the vehicle body surface under uniform pressure over the entire area thereof.

Though, in the embodiments described above, the mark detecting operation and the sanding operation are effected with the vehicle body set in different positions, i.e., at the mark detecting station (L2 or ST2) and the sanding station (L3 or ST3), it is possible to effect both the operations with the vehicle body in a position. In such a case, for example, while the mark detecting robots are detecting the defect marks, the sanding robot(s) waits in a position away from the vehicle body and the mark detecting robots are moved away from the vehicle body after the mark detecting operation and the sanding robot(s) is once moved to the reference point and begins sanding operation from the reference point.

What is claimed is:

1. A method of wet-sanding defective parts of a coated surface of a vehicle body while the vehicle body is intermittently conveyed along a conveyor line comprising:

visually inspecting the coated surface of the vehicle body for defective parts at a first station;

marking each of the defective parts found with a predetermined defect mark in accordance with a type of defect found at the first station;

searching the coated surface for said predetermined defect marks with a detecting means and generating a defect signal indicative of the type of defect found while the vehicle body is stopped at a second station downstream of the first station;

sanding the marked parts of the coated surface of the vehicle body with a sanding means; and controlling the sanding of the coated surface in accordance with the defect signal of the detecting means.

2. A method as defined in claim 1 in which said detecting means comprises a TV camera and an image processing means which detects the predetermined defect marks in the image recorded by the TV camera and can distinguish a shape of the predetermined defect mark, and said step of marking the defective parts comprises the step of marking the defective parts with predetermined defect marks the shape of each defect mark depending on a grade of sanding required to correct the defective part.

3. A method as defined in claim 1 in which said detecting means comprises a TV camera and an image processing means which detects the predetermined defect marks in the image recorded by the TV camera and can distinguish a color of the predetermined defect mark, and said step of marking the defective parts comprises the step of marking the defective parts with predetermined defect marks the color of each defect mark depending on a grade of sanding required to correct the defective part.

4. A method as defined in claim 1 in which said detecting means comprises a TV camera and an image processing means which detects the predetermined defect marks in the image recorded by the TV camera, and said coated surface of the vehicle body is divided into a plurality of detecting divisions each of which has an area substantially equal to an area of a detecting range in a field of view of the TV camera, said step of searching the coated surface for the predetermined defect marks comprising the steps of moving the TV camera from detecting division to detecting division so that the detecting range is centered on a center of each detecting division.

5. A method as defined in claim 4 in which said detecting range of the TV camera is slightly larger in area than each of the detecting divisions so that when the TV camera is centered on the center of a given detecting division, the detecting range of the TV camera covers part of the detecting divisions adjacent to the given detecting division.

6. A method as defined in claim 1 in which said step of sanding the marked portions comprises detecting a distance between adjacent marked portions and sanding at one time a plurality of marked portions which are at a predetermined distance from each other.

7. A method as defined in claim 1 further comprising the step of washing the marked portions after the step of sanding.

8. A method as defined in claim 1, wherein the searching of the coated surface of the vehicle includes independently searching a left side of the vehicle, a right side of the vehicle and an upper side of the vehicle.

9. A method as defined in claim 1, wherein the wet-sanding of the coated surface of the vehicle includes independently sanding a left side of the vehicle, a right side of the vehicle and an upper side of the vehicle.

10. A method as defined in claim 1, wherein said step of sanding the marked parts of the coated surface includes wet-sanding the marked parts.

* * * * *